United States Patent
Yerramalli et al.

(10) Patent No.: US 11,051,263 B2
(45) Date of Patent: Jun. 29, 2021

(54) SYNCHRONIZATION CHANNEL AND SYSTEM ACQUISITION FOR INTERNET OF THINGS COMMUNICATIONS IN A SHARED SPECTRUM

(71) Applicant: QUALCOMM Incorporated, San Diego, CA (US)

(72) Inventors: Srinivas Yerramalli, San Diego, CA (US); Arumugam Chendamarai Kannan, San Diego, CA (US); Chih-Hao Liu, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 15/989,698

(22) Filed: May 25, 2018

(65) Prior Publication Data
US 2018/0368089 A1  Dec. 20, 2018

Related U.S. Application Data

(60) Provisional application No. 62/520,386, filed on Jun. 15, 2017.

(51) Int. Cl.
*H04J 11/00* (2006.01)
*H04W 16/14* (2009.01)
(Continued)

(52) U.S. Cl.
CPC ..... *H04W 56/0015* (2013.01); *H04J 11/0069* (2013.01); *H04J 11/0073* (2013.01);
(Continued)

(58) Field of Classification Search
CPC .............. H04J 11/0069; H04J 11/0073; H04J 11/0076; H04J 2011/0096; H04L 5/0048;
(Continued)

(56) References Cited

U.S. PATENT DOCUMENTS 8,599,818 B2 * 12/2013 Lee ........................ H04W 48/12
370/344
9,325,466 B2 * 4/2016 Miao ..................... H04L 5/0094
(Continued)

FOREIGN PATENT DOCUMENTS

| CN | 102265680 A | 11/2011 |
| CN | 104796242 A | 7/2015 |
| WO | WO-2016021979 A1 | 2/2016 |

OTHER PUBLICATIONS

Samsung: "SS Bandwidth and Sequence Design," 3GPP Draft; R1-1705317, 3rd Generation Partnership Project (3GPP), Mobile Competence Centre; 650, Route des Lucioles; F-06921 Sophia-Antipolis Cedex; France, vol. RAN WG1, No. Spokane, USA; Apr. 3, 2017-Apr. 7, 2017, Apr. 2, 2017 (Apr. 2, 2017), XP051243447, pp. 1-12, Retrieved from the Internet: URL: http://www.3gpp.org/ftp/Meetings_3GPP_SYNC/RAN1/Docs/ [retrieved on Apr. 2, 2017].
(Continued)

*Primary Examiner* — Alpus Hsu
(74) *Attorney, Agent, or Firm* — Liem T. Do

(57) ABSTRACT

Methods, systems, and devices for wireless communication are described. A base station may identify a first synchronization sequence and generate a second synchronization sequence based at least in part on the first synchronization sequence. The base station may map the first synchronization sequence to a first resource block of a synchronization channel associated with a first frequency sub-band of a shared radio frequency spectrum band and the second synchronization sequence to a second resource block associated with a second frequency sub-band of the synchronization channel. The base station may then transmit the first synchronization sequence and the second synchronization sequence concurrently over the synchronization channel using the first resource block and the second resource block according to the mapping. In some cases, the second syn-
(Continued)

chronization may be generated by applying a first phase shift to the first synchronization sequence.

30 Claims, 18 Drawing Sheets

(51) Int. Cl.
    *H04W 56/00*     (2009.01)
    *H04L 5/00*     (2006.01)
    *H04L 27/26*     (2006.01)
    *H04W 72/04*     (2009.01)

(52) U.S. Cl.
    CPC ........ *H04J 11/0076* (2013.01); *H04L 5/0048* (2013.01); *H04L 27/2613* (2013.01); *H04L 27/2614* (2013.01); *H04W 16/14* (2013.01); *H04J 2011/0096* (2013.01); *H04W 72/0426* (2013.01); *H04W 72/0453* (2013.01)

(58) Field of Classification Search
    CPC ........... H04L 27/2613; H04L 27/2614; H04W 16/14; H04W 56/0015; H04W 72/0426; H04W 72/0453
    See application file for complete search history.

(56) References Cited

U.S. PATENT DOCUMENTS

| | | | | |
|---|---|---|---|---|
| 9,407,403 B2* | 8/2016 | Yi | ............................ | H04L 5/001 |
| 9,591,637 B2* | 3/2017 | Dinan | ................. | H04L 27/2649 |
| 10,057,839 B2* | 8/2018 | Ng | ........................ | H04J 11/0069 |
| 10,182,412 B2* | 1/2019 | Ko | .................... | H04W 56/0035 |
| 10,257,797 B2* | 4/2019 | You | ...................... | H04J 11/0073 |
| 10,362,610 B2* | 7/2019 | Chen | .................... | H04L 5/0048 |
| 10,389,567 B2* | 8/2019 | Si | ......................... | H04L 27/2613 |
| 2016/0269872 A1* | 9/2016 | Kim | ........................ | H04W 4/70 |
| 2016/0294528 A1* | 10/2016 | Kim | ........................ | H04L 5/001 |
| 2017/0064685 A1* | 3/2017 | Rico Alvarino | ..... | H04B 7/0456 |
| 2017/0094621 A1* | 3/2017 | Xu | ........................ | H04W 56/001 |
| 2017/0127367 A1* | 5/2017 | Axnas | ............... | H04W 56/0015 |
| 2017/0359791 A1* | 12/2017 | Onggosanusi | ...... | H04L 27/2613 |
| 2017/0373812 A1* | 12/2017 | Berggren | ............ | H04W 56/001 |
| 2018/0041949 A1* | 2/2018 | Liu | ................... | H04W 74/0833 |
| 2018/0048413 A1* | 2/2018 | Liu | ...................... | H04J 11/0069 |
| 2018/0295007 A1* | 10/2018 | Kumar | ................ | H04L 27/2613 |

OTHER PUBLICATIONS

Ericsson: "Synchronization Signal Sequence Design," 3GPP Draft; R1-1700295_SS_SEQUENCE_DESIGN, 3rd Generation Partnership Project (3GPP), Mobile Competence Centre; 650, Route Des Lucioles; F-06921 Sophia-Antipolis Cedex; France, vol. RAN WG1, No. Spokane, WA, USA; Jan. 16, 2017-Jan. 20, 2017, Jan. 16, 2017, XP051207833, 6 pages, Retrieved from the Internet: URL: http://www.3gpp.org/ftp/Meetings_3GPP_SYNC/RAN1/Docs/ [retrieved on Jan. 16, 2017].

International Search Report and Written Opinion—PCT/US2018/034912—ISA/EPO—dated Aug. 23, 2018.

* cited by examiner

SYNCHRONIZATION CHANNEL AND SYSTEM ACQUISITION FOR INTERNET OF THINGS COMMUNICATIONS IN A SHARED SPECTRUM

CROSS REFERENCES

The present application for patent claims the benefit of U.S. Provisional Patent Application No. 62/520,386 by Yerramalli, et al., entitled "Synchronization Channel and System Acquisition For Internet of Things Communications in a Shared Spectrum," filed Jun. 15, 2017, assigned to the assignee hereof, and expressly incorporated herein.

BACKGROUND

The following relates generally to wireless communication, and more specifically to synchronization channel and system acquisition for Internet of Things (IoT) communications in a shared spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Some wireless communications systems may enable communication between a base station and a UE over different radio frequency spectrum operating bandwidths (e.g., wideband operation, narrow-band operation, etc.). When the UE performs system acquisition to connect to a serving cell or identifies neighboring cells, the UE may receive one or more synchronization signals of a base station, such as a primary synchronization signal (PSS), a secondary synchronization signal (SSS), or both. The synchronization signal(s) may allow the UE to identify a physical cell ID, as well as time slot and frame synchronization, which may allow the UE to read a system information block (SIB) of a base station. For some regulatory domains, regulations define a minimum bandwidth for every transmission. Such bandwidth regulations may result in the synchronization signals occupying more than one resource block. On the other hand, some UEs may be configured with narrowband receivers capable of receiving just one resource block at a time. Improved techniques for transmission of synchronization signals may thus be desired.

SUMMARY

The described techniques relate to improved methods, systems, devices, and apparatuses that support synchronization techniques for user equipment (UEs) configured to operate using a bandwidth that is less than a total bandwidth allocated to synchronization signals broadcast by a base station for system acquisition. The synchronization signals may be conveyed using synchronization sequences. The bandwidth allocated to the synchronization signals may be divided into multiple resource blocks, and the base station may transmit variants of a base synchronization sequence over different resource blocks. A narrowband UE receiving any one of the resource blocks may obtain the base synchronization sequence, determine the system acquisition information based on the base synchronization sequence, and use the system acquisition information to synchronize with a serving cell implemented by the base station. Additionally, a UE capable of receiving multiple resource blocks at the same time may combine different resource blocks to improve the accuracy and reliability of obtaining the base synchronization sequence.

A method of wireless communication is described. The method may include identifying a first synchronization sequence, generating a second synchronization sequence based on the first synchronization sequence, mapping the first synchronization sequence to a first resource block of a synchronization channel associated with a first frequency sub-band of a shared radio frequency spectrum band and the second synchronization sequence to a second resource block associated with a second frequency sub-band of the synchronization channel, and transmitting the first synchronization sequence and the second synchronization sequence concurrently over the synchronization channel using the first resource block and the second resource block according to the mapping.

An apparatus for wireless communication is described. The apparatus may include means for identifying a first synchronization sequence, means for generating a second synchronization sequence based on the first synchronization sequence, means for mapping the first synchronization sequence to a first resource block of a synchronization channel associated with a first frequency sub-band of a shared radio frequency spectrum band and the second synchronization sequence to a second resource block associated with a second frequency sub-band of the synchronization channel, and means for transmitting the first synchronization sequence and the second synchronization sequence concurrently over the synchronization channel using the first resource block and the second resource block according to the mapping.

Another apparatus for wireless communication is described. The apparatus may include a processor, memory in electronic communication with the processor, and instructions stored in the memory. The instructions may be operable to cause the processor to identify a first synchronization sequence, generate a second synchronization sequence based on the first synchronization sequence, map the first synchronization sequence to a first resource block of a synchronization channel associated with a first frequency sub-band of a shared radio frequency spectrum band and the second synchronization sequence to a second resource block associated with a second frequency sub-band of the synchronization channel, and transmit the first synchronization sequence and the second synchronization sequence concurrently over the synchronization channel using the first resource block and the second resource block according to the mapping.

A non-transitory computer readable medium for wireless communication is described. The non-transitory computer-readable medium may include instructions operable to cause a processor to identify a first synchronization sequence, generate a second synchronization sequence based on the first synchronization sequence, map the first synchronization sequence to a first resource block of a synchronization channel associated with a first frequency sub-band of a shared radio frequency spectrum band and the second synchronization sequence to a second resource block associated with a second frequency sub-band of the synchronization channel, and transmit the first synchronization sequence and the second synchronization sequence concurrently over the synchronization channel using the first resource block and the second resource block according to the mapping.

In some examples of the method, apparatus, and non-transitory computer-readable medium described above, generating the second synchronization sequence comprises applying a first phase shift to the first synchronization sequence. Some examples of the method, apparatus, and non-transitory computer-readable medium described above may further include processes, features, means, or instructions for generating a third synchronization sequence by applying a second phase shift to the first synchronization sequence. In some cases, the second phase shift being different from the first phase shift. Some examples of the method, apparatus, and non-transitory computer-readable medium described above may further include processes, features, means, or instructions for mapping the third synchronization sequence to a third resource block of the synchronization channel.

Some examples of the method, apparatus, and non-transitory computer-readable medium described above may further include processes, features, means, or instructions for transmitting the third synchronization sequence using the third resource block. Some examples of the method, apparatus, and non-transitory computer-readable medium described above may further include processes, features, means, or instructions for transmitting the third synchronization sequence may be concurrent with transmitting the first synchronization sequence and the second synchronization sequence.

In some examples of the method, apparatus, and non-transitory computer-readable medium described above, the second phase shift may be a multiple of the first phase shift. In some examples of the method, apparatus, and non-transitory computer-readable medium described above, the first phase shift may be different than the second phase shift, and the second phase shift may be based on a payload of a secondary synchronization signal (SSS).

In some examples of the method, apparatus, and non-transitory computer-readable medium described above, the first phase shift may be same as the second phase shift. In some examples of the method, apparatus, and non-transitory computer-readable medium described above, the first phase shift may be based on a bandwidth of the shared radio frequency spectrum band.

In some examples of the method, apparatus, and non-transitory computer-readable medium described above, the first synchronization sequence comprises at least one of a primary synchronization signal (PSS), an SSS, a physical broadcast channel (PBCH), or combinations thereof.

Some examples of the method, apparatus, and non-transitory computer-readable medium described above may further include processes, features, means, or instructions for generating the second synchronization sequence may be further based on a content of the PSS, the SSS, or the PBCH.

In some examples of the method, apparatus, and non-transitory computer-readable medium described above, generating the second synchronization sequence comprises scrambling the first synchronization sequence using a first scrambling sequence.

In some examples of the method, apparatus, and non-transitory computer-readable medium described above, the first scrambling sequence comprises at least one of a maximum length sequence (m-sequence), a Zadoff-Chu sequence, or a combination thereof.

Some examples of the method, apparatus, and non-transitory computer-readable medium described above may further include processes, features, means, or instructions for generating a third synchronization sequence by scrambling the first synchronization sequence using a second scrambling sequence. Some examples of the method, apparatus, and non-transitory computer-readable medium described above may further include processes, features, means, or instructions for mapping the third synchronization sequence to a third resource block of the synchronization channel.

Some examples of the method, apparatus, and non-transitory computer-readable medium described above may further include processes, features, means, or instructions for transmitting the third synchronization sequence using the third resource block. Some examples of the method, apparatus, and non-transitory computer-readable medium described above may further include processes, features, means, or instructions for transmitting the third synchronization sequence may be concurrent with transmitting the first synchronization sequence and the second synchronization sequence.

A method of wireless communication is described. The method may include receiving a first synchronization sequence over a synchronization channel using a first resource block associated with a first frequency sub-band of a shared radio frequency spectrum band, receiving a second synchronization sequence over the synchronization channel using a second resource block associated with a second frequency sub-band of the shared radio frequency spectrum band, obtaining system acquisition information for a base station based on a combination of the first synchronization sequence and the second synchronization sequence, and establishing a connection with the base station using the obtained system acquisition information. In some cases, the first resource block and the second resource block are concurrent in time.

An apparatus for wireless communication is described. The apparatus may include means for receiving a first synchronization sequence over a synchronization channel using a first resource block associated with a first frequency sub-band of a shared radio frequency spectrum band, means for receiving a second synchronization sequence over the synchronization channel using a second resource block associated with a second frequency sub-band of the shared radio frequency spectrum band, means for obtaining system acquisition information for a base station based on a combination of the first synchronization sequence and the second synchronization sequence, and means for establishing a connection with the base station using the obtained system acquisition information. In some cases, the first resource block and the second resource block are concurrent in time.

Another apparatus for wireless communication is described. The apparatus may include a processor, memory in electronic communication with the processor, and instructions stored in the memory. The instructions may be operable to cause the processor to receive a first synchronization sequence over a synchronization channel using a first resource block associated with a first frequency sub-band of a shared radio frequency spectrum band, receive a second synchronization sequence over the synchronization channel using a second resource block associated with a second frequency sub-band of the shared radio frequency spectrum band, obtain system acquisition information for a base station based on a combination of the first synchronization sequence and the second synchronization sequence, and establish a connection with the base station using the obtained system acquisition information. In some cases, the first resource block and the second resource block are concurrent in time.

A non-transitory computer readable medium for wireless communication is described. The non-transitory computer-readable medium may include instructions operable to cause a processor to receive a first synchronization sequence over a synchronization channel using a first resource block associated with a first frequency sub-band of a shared radio frequency spectrum band, receive a second synchronization sequence over the synchronization channel using a second resource block associated with a second frequency sub-band of the shared radio frequency spectrum band, obtain system acquisition information for a base station based on a combination of the first synchronization sequence and the second synchronization sequence, and establish a connection with the base station using the obtained system acquisition information. In some cases, the first resource block and the second resource block are concurrent in time.

In some examples of the method, apparatus, and non-transitory computer-readable medium described above, obtaining the system acquisition information comprises applying a first phase shift to the second synchronization sequence to obtain a phase-shifted version of the second synchronization sequence. In some examples of the method, apparatus, and non-transitory computer-readable medium described above, the combination of the first synchronization sequence and the second synchronization sequence comprises a sum of the first synchronization sequence and the phase-shifted version of the second synchronization sequence.

Some examples of the method, apparatus, and non-transitory computer-readable medium described above may further include processes, features, means, or instructions for receiving a third synchronization sequence over the synchronization channel using a third resource block associated with a third sub-band of the shared radio frequency spectrum. In some cases, the first resource block, the second resource block, and the third resource block may be concurrent in time. Some examples of the method, apparatus, and non-transitory computer-readable medium described above may further include processes, features, means, or instructions for applying a second phase shift to the third synchronization sequence to obtain a phase-shifted version of the third synchronization sequence. In some cases, the combination of the first synchronization sequence and the second synchronization sequence comprises a sum of the first synchronization sequence, the phase-shifted version of the second synchronization sequence, and the phase-shifted version of the third synchronization sequence.

In some examples of the method, apparatus, and non-transitory computer-readable medium described above, the second phase shift may be a multiple of the first phase shift. In some examples of the method, apparatus, and non-transitory computer-readable medium described above, the first phase shift may be different than the second phase shift, and the second phase shift may be based on a payload of the SSS.

In some examples of the method, apparatus, and non-transitory computer-readable medium described above, the first phase shift may be based on a bandwidth of the shared radio frequency spectrum band. In some examples of the method, apparatus, and non-transitory computer-readable medium described above, the first synchronization sequence comprises at least one of a PSS, an SSS, a PBCH, or combinations thereof.

In some examples of the method, apparatus, and non-transitory computer-readable medium described above, the second synchronization sequence may be based on a content of the PSS, the SSS, or the PBCH.

In some examples of the method, apparatus, and non-transitory computer-readable medium described above, obtaining the system acquisition information for the base station comprises: detecting a timing parameter based on a content of the PSS. Some examples of the method, apparatus, and non-transitory computer-readable medium described above may further include processes, features, means, or instructions for detecting an identification parameter based on a payload of the SSS. Some examples of the method, apparatus, and non-transitory computer-readable medium described above may further include processes, features, means, or instructions for determining a cell specific reference signal (CRS) sequence based on the timing parameter and the identification parameter. Some examples of the method, apparatus, and non-transitory computer-readable medium described above may further include processes, features, means, or instructions for decoding the PBCH using the CRS sequence.

In some examples of the method, apparatus, and non-transitory computer-readable medium described above, obtaining the system acquisition information comprises unscrambling the first synchronization sequence using a first scrambling sequence and unscrambling the second synchronization sequence using a second scrambling sequence.

In some examples of the method, apparatus, and non-transitory computer-readable medium described above, the first scrambling sequence and the second scrambling sequence comprise at least one of: an m-sequence, a Zadoff-Chu sequence, or a combination thereof.

Some examples of the method, apparatus, and non-transitory computer-readable medium described above may further include processes, features, means, or instructions for receiving a third synchronization sequence over the synchronization channel using a third resource block associated with a third sub-band of the shared radio frequency spectrum band. In some cases, the first resource block, the second resource block, and the third resource block may be concurrent in time.

Some examples of the method, apparatus, and non-transitory computer-readable medium described above may further include processes, features, means, or instructions for unscrambling the third synchronization sequence using a third scrambling sequence. In some examples of the method, apparatus, and non-transitory computer-readable medium described above, the combination of the first synchronization sequence and the second synchronization sequence comprises a combination of the first synchronization sequence, the second synchronization sequence, and the third synchronization sequence.

In some examples of the method, apparatus, and non-transitory computer-readable medium described above, unscrambling the third synchronization sequence using the third scrambling sequence comprises: performing a blind detection of the third synchronization sequence using the first scrambling sequence, the second scrambling sequence, and the third scrambling sequence.

DETAILED DESCRIPTION

The described techniques relate to improved methods, systems, devices, and apparatuses that support synchronization channel and system acquisition for Internet of Things (IoT) communications in a shared spectrum. The described synchronization techniques for user equipment (UEs) configured to operate using a bandwidth that is less than a total bandwidth allocated to synchronization signals broadcast by a base station for system acquisition. The bandwidth allocated to the synchronization signals may be divided into multiple resource blocks, and the base station may transmit variants of a base synchronization sequence over different resource blocks. Thus, a narrowband UE receiving any one of the resource blocks may obtain the base synchronization sequence, determine the system acquisition information based on the base synchronization sequence, and use the system acquisition information to synchronize with a serving cell implemented by the base station. Additionally, a UE capable of receiving multiple resource blocks at the same time may combine different resource blocks to improve the accuracy and reliability of obtaining the base synchronization sequence.

In some examples, the base station may transmit the base synchronization sequence with different phase shifts over concurrent resource blocks within the specified bandwidth. The use of different phase shifts with different resource blocks may preserve the benefits of redundancy for combining purposes while at the same time reducing an overall peak-to-average power ratio (PAPR) of synchronization signal transmissions.

Additionally, or alternatively, the base station may scramble a base synchronization sequence using different scrambling sequences for different concurrent resource blocks within the bandwidth allocated to the synchronization signals. A UE receiving one of the resource blocks may perform blind decoding to determine which scrambling sequence is applicable to that resource block.

In some examples, each of the resource blocks may include a physical broadcast channel (PBCH) message. The payload of the PBCH message may be scrambled based on resource block index to reduce the PAPR associated with synchronization transmissions over the resource blocks.

Aspects of the disclosure are initially described in the context of a wireless communications system. Examples of synchronization signal designs, and scrambling sequences that support synchronization techniques are described herein. Aspects of the disclosure are further illustrated by and described with reference to apparatus diagrams, system diagrams, and flowcharts that relate to synchronization channel and system acquisition for IoT communications in a shared spectrum.

Figure 1:
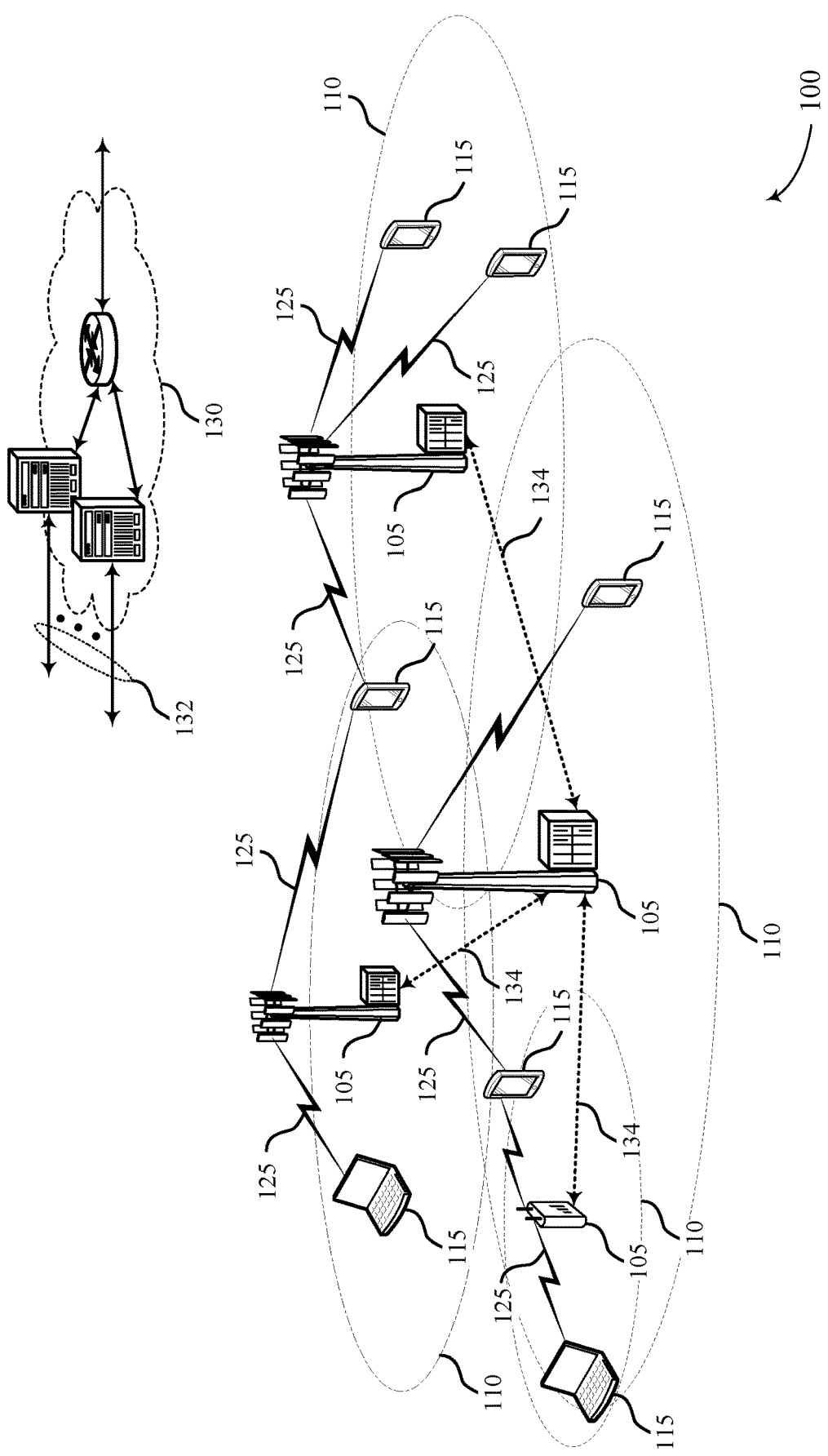
FIG. 1 illustrates an example of a system for wireless communication that supports synchronization channel and system acquisition for IoT communications in a shared spectrum in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support synchronization channel and system acquisition for IoT communications in a shared spectrum.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an IoT device, an Internet of Everything (IoE) device, a machine type communication (MTC) device, an appliance, an automobile, or the like.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device such as a base station 105 or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f$=307200$T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may be a set of time and frequency resources defined by one symbol period and one subcarrier (e.g., a 15 KHz frequency range). A resource block may be the smallest schedulable block of time and frequency resources, and may be defined by a fixed number of consecutive subcarriers in the frequency domain (e.g., 12 subcarriers) and a fixed number of OFDM symbols in the time domain (e.g., 7 OFDM symbols with a normal cyclic prefix, 6 OFDM symbols with an extended cyclic prefix). The size of a resource block in the time domain also may be referred to as one slot, or half of a subframe. A resource block defined by 12 subcarriers in the frequency domain and 7 OFDM symbols in the time domain may include a total of 84 resource elements. Such a resource block may span 180 kHz in the frequency domain and 0.5 ms in the time domain. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both on frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

According to techniques described herein, wireless communications system 100 may support synchronization techniques for UEs 115 configured to operate using a bandwidth that is less than a total bandwidth allocated to synchronization signals broadcast by base station 105 for system acquisition. Base station 105 may transmit one or more variants of a base synchronization sequence over multiple resource blocks. Base station 105 may transmit the base synchronization sequence with different phase shifts over resource blocks within the specified bandwidth. The resource blocks may be transmitted concurrently to UE 115. Base station 105 may scramble a base synchronization sequence using different scrambling sequences for different concurrent resource blocks. Additionally or alternatively, UE 115, upon receiving any one of the resource blocks may obtain the base synchronization sequence, and may synchronize with a serving cell implemented by base station 105.

Figure 2:
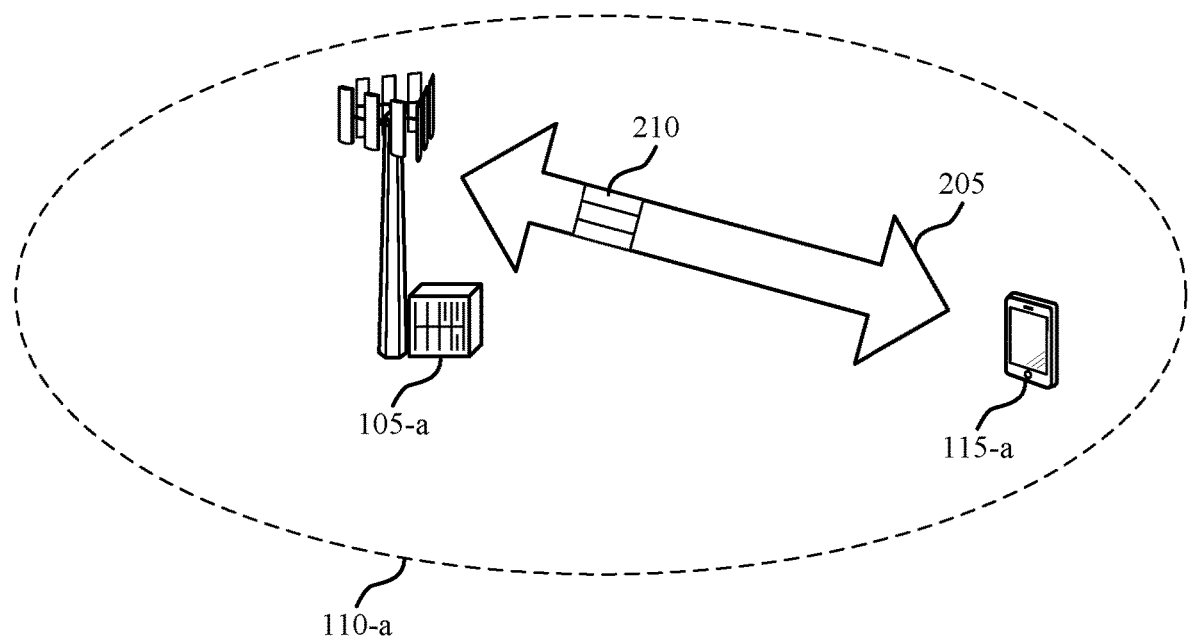
FIG. 2 illustrates an example of a wireless communications system that supports synchronization channel and system acquisition for IoT communications in a shared spectrum in accordance with aspects of the present disclosure.

FIG. 2 illustrates an example of a wireless communications system 200 that supports synchronization channel and system acquisition for IoT communications in a shared spectrum in accordance with various aspects of the present disclosure. In some examples, the wireless communications system 200 may include a base station 105-a and UE 115-a, which may be examples of the corresponding devices as described with reference to FIG. 1. Base station 105-a may communicate over a system operating bandwidth within a coverage area 110-a. Further, base station 105-a may utilize synchronization signals (e.g., for cell acquisition procedures with UE 115-a). Synchronization signals may be transmitted over a synchronization signal bandwidth 205, which may be equal to or less than the system operating bandwidth. The synchronization signals may be conveyed using synchronization sequences. Further, base station 105-a and UE 115-a may communicate over multiple resource blocks 210. In some cases, the UE 115-a UEs may be configured with narrowband receivers capable of receiving one resource block at a time. That is, wireless communications system 200 may support communications that entail the use of multiple resource blocks at one time, while at least a subset of UEs 115 are capable of receiving and/or processing fewer resource blocks (e.g., one resource block) at one time than are supported by the wireless communications system 200.

The bandwidth allocated to the synchronization signals may be divided into multiple resource blocks 210, and base station 105-a may transmit variants of a base synchronization sequence over different resource blocks. For example, a base synchronization sequence may be transmitted over a first resource block 210 and a phase shifted version of the base synchronization sequence may be transmitted over a second resource block. In one embodiment, modifications to synchronization signals may be employed upon determining that the bandwidth 205 allocated by the wireless communications system 200 include multiple resource blocks. For example, base station 105-a may design partially decodable synchronization signals to allow partial correlation/decodability by UE 115-a. As an extension, a synchronization signal may be designed as a set of concatenated FDM synchronization sequences (e.g., via primary synchronization signal (PSS)/secondary synchronization signal (SSS) design, phase shifting, scrambling of the synchronization signal, etc.), such that each synchronization sequence may be decodable by the UE 115-a.

In some cases, UEs may utilize both synchronization signals for cell acquisition. For example, if UE 115-a is capable of receiving multiple resource blocks at one time, the UE 115-a may further improve its coverage by jointly detecting the synchronization sequences mapped to multiple resource blocks 210. On the other hand, if the UE 115-a is capable of receiving one resource block at one time, the UE 115-a may still receive the base sequence or a modified version of the base sequence mapped to a single resource block 210. UE 115-a may also use blind detection (e.g., via hypothesis testing) of the synchronization sequences.

Additionally, techniques discussed herein may be used on an individual synchronization signal basis. That is, different techniques discussed may be used for different synchronization signals (e.g., PSS and/or SSS may lend itself to one solution, while PBCH may lend itself to another solution). In some cases, a synchronization signal bandwidth associated with a wireless technology may be greater than a system operating bandwidth. For example, a wireless technology may support X MHz synchronization signal bandwidth, and a UE operating in the wireless network (e.g., utilizing the wireless technology) may support Y MHz, such that Y<X. A In such cases, techniques described may apply.

Figure 3A:
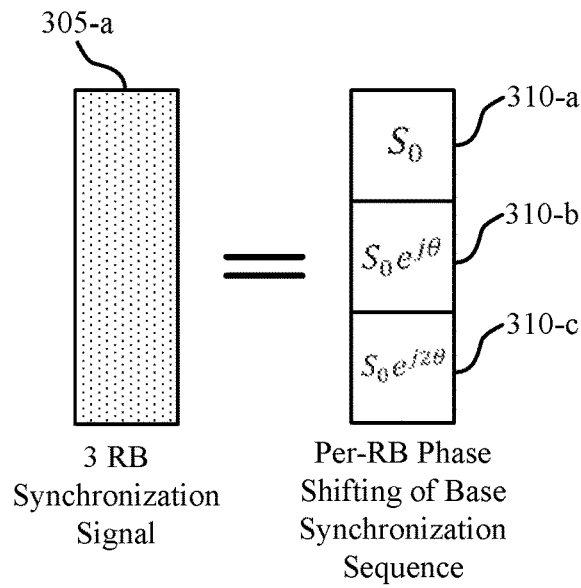
FIGS. 3A-3B illustrate examples of synchronization signal designs that support synchronization channel and system acquisition for IoT communications in a shared spectrum in accordance with aspects of the present disclosure.
Figure 3B:
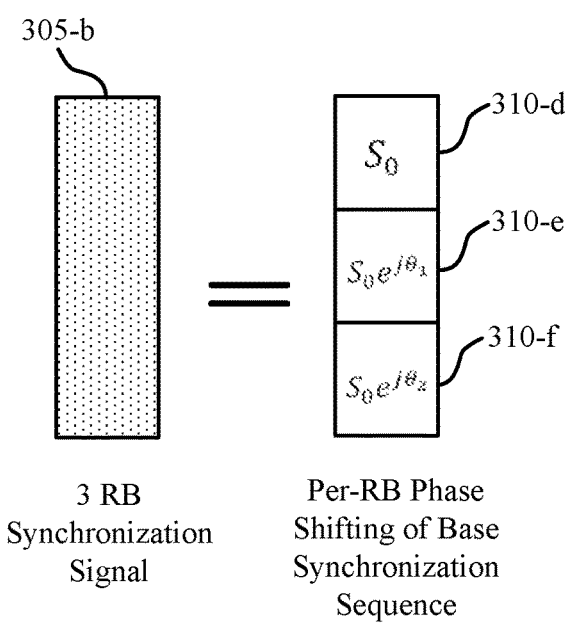

FIGS. 3A and 3B illustrate examples of synchronization signal designs where 300 and 301 that support synchronization channel and system acquisition for IoT communications in a shared spectrum in accordance with various aspects of the present disclosure. In some examples, synchronization signal designs 300 and 301 may implement aspects of wireless communication system 100.

Specifically, FIGS. 3A and 3B may illustrate examples of synchronization signal designs where multiple resource blocks are concatenated in frequency domain. For example, a variant of a base synchronization sequence may be transmitted over each resource block. FIGS. 3A and 3B include synchronization signals 305 and synchronization sequences mapped to resource blocks 310 (e.g., which, in some cases, may refer to or include narrow-band synchronization signals). Synchronization signal designs 300 and 301 may be utilized by base stations 105 and UEs 115 as described with reference to FIGS. 1 and 2.

In some cases, a PSS sequence and/or an SSS sequence may be designed as a concatenation of multiple non-overlapping segments (e.g., resource blocks 310). Each resource block 310 may be individually detectable by a narrowband UE. That is, synchronization signal 305-a may be transmitted as multiple synchronization sequences mapped to multiple resource blocks. In the case of a PSS sequence, the base synchronization sequence to convey the PSS signaling may be mapped to a first resource block 310-a. A modified version of the base synchronization sequence may be mapped to the second resource block 310-b. The modified version of the base synchronization sequence may include a phase shifted version of the base synchronization sequence. Another modified version of the modified synchronization sequence may be mapped to a third resource block (310-c). In the example of FIG. 3A, each modified base synchronization sequence is generated using phase shifts that are multiple of each other. FIG. 3A illustrates three different resource blocks 310 making up the synchronization signal 305-a. In some regulatory domains, the base station is configured to transmit a synchronization signal over multiple resource blocks 310. As discussed previously, resource block 310-a may include a base synchronization sequence ($S_0$). Resource block 310-b may include a phase shifted version of the base synchronization sequence $$(S_1 = S_0 e^{j\theta}).$$

The third resource block 310-c may include a phase shifted version of the modified synchronization sequence $S_1$. The third resource block 310-c may include sequence $S_2$. In one example, $$S_2 = S_0 e^{j2\theta}.$$

thus the sequence $S_1$ is generated by applying a first phase shift to the sequence $S_0$, and the sequence $S_2$ is generated by applying a second phase shift to the sequence $S_0$. In the example of FIG. 3A, the second phase shift is a multiple of the first phase shift.

Thus, in this example, the synchronization signal 305-a includes a first synchronization sequence ($S_0$) mapped to the first resource block 310-a, a second synchronization sequence $$(S_1 = S_0 e^{j\theta})$$

which is based on the first synchronization sequence ($S_0$) and mapped to the second resource block 310-b, and a third synchronization sequence $$(S_2 = S_0 e^{j2\theta})$$

which is based on the first synchronization sequence ($S_0$) and mapped to the third resource block 310-c.

In the example of FIG. 3B, each resource block 310 that makes up the synchronization signal 305-b may be a base sequence and a phase shifted version of the base sequence. Synchronization signal 305-b may be transmitted as multiple synchronization sequences mapped to multiple resource blocks 310. In one example, a base synchronization sequence used to convey a synchronization signal may be mapped to a first resource block 310-d. A modified version of the base synchronization sequence may be mapped to the second resource block 310-d. The modified version of the base synchronization sequence may include a phase shifted version of the base synchronization sequence mapped to the second resource block 310-e. Another modified version of the modified synchronization sequence may be mapped to a third resource block (310-f). FIG. 3B illustrates three different resource blocks 310 making up the synchronization signal 305-b. resource block 310-d may include a base synchronization sequence (S₀). resource block 310-e may include a phase shifted version of the base synchronization sequence $$(S_1 = S_0 e^{j\theta_1}).$$

The third resource block 310-f may include a phase shifted version of the modified synchronization sequence $S_1$. The third resource block 310-f may include sequence $S_2$. In one example, $$S_2 = S_0 e^{j\theta_2}.$$

Thus the sequence $S_1$ is generated by applying a first phase shift to the sequence $S_0$, and the sequence $S_2$ is generated by applying a second phase shift to the sequence $S_0$. In the example of FIG. 3B, the second phase shift is different from the first phase shift.

Thus, in this example, the synchronization signal 305-b includes a first synchronization sequence ($S_0$) mapped to the first resource block 310-d, a second synchronization sequence $$(S_1 = S_0 e^{j\theta_1})$$

which is based on the first synchronization sequence ($S_0$) and mapped to the second resource block 310-b, and a third synchronization sequence $$(S_2 = S_0 e^{j\theta_2})$$

which is based on the first synchronization sequence ($S_0$) and mapped to the third resource block 310-c.

In some cases, the techniques described in the examples of FIGS. 3A and 3B may be extended to the TDM symbol containing the wide-band synchronization signal. As such, concatenated FDM synchronization signal designs may support narrow-band UE synchronization.

Figure 4:
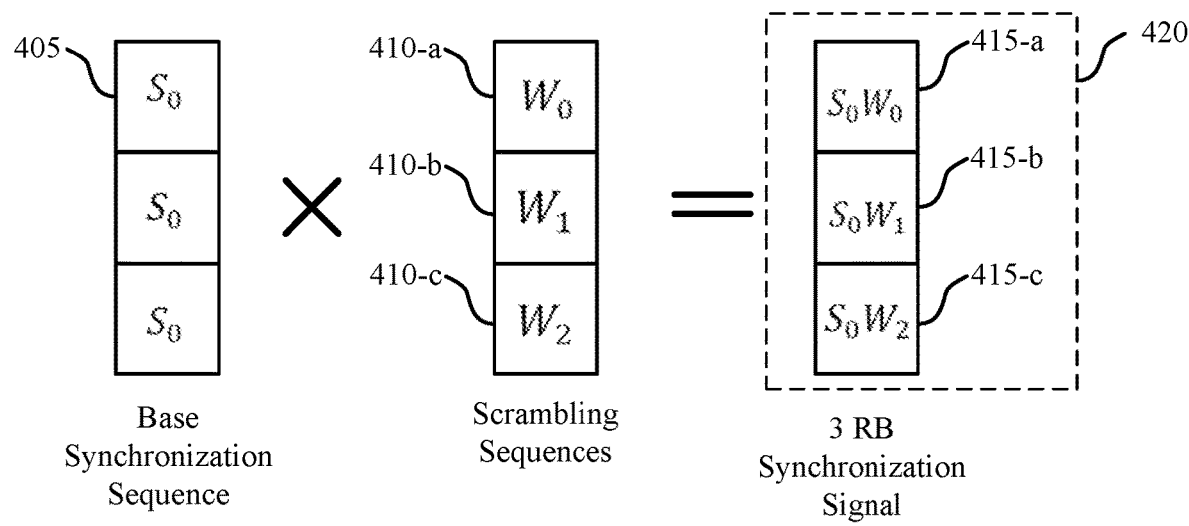
FIG. 4 illustrates an example of a synchronization signal scrambling that supports synchronization channel and system acquisition for IoT communications in a shared spectrum in accordance with aspects of the present disclosure.

FIG. 4 illustrates an example of a synchronization sequence scrambling 400 that supports synchronization channel and system acquisition for IoT communications in a shared spectrum in accordance with various aspects of the present disclosure. Specifically, FIG. 4 may illustrate examples of synchronization signal scrambling for bandwidths supporting multiple resource blocks (e.g., resource block-wise scrambling of PSS/SSS). FIG. 4 shows multiple instances of a base synchronization sequence $S_0$ 405 multiplied by different scrambling sequences 410-a, 410-b, 410-c, to generate three resource blocks 415-a, 415-b, 415-c which individually or collectively can be referred to as a synchronization signal 420 (e.g., which, in some cases, may refer to or include resource blocks that may be individually decoded by narrow-band UEs). This example of synchronization sequence scrambling 400 may be utilized by base stations 105 and UEs 115 as described with reference to FIGS. 1 and 2.

Similar benefits associated with the examples of FIGS. 4A and 4B may be achieved with an independent baseline synchronization sequence $S_0$ using scrambling. Scrambling sequences $W_0$, $W_1$, $W_2$ may be, for example, binary sequences having a constant amplitude, such as maximum length sequences (m-sequences) or Zadoff-Chu sequences. In one example, different scrambling sequences may be used on different resource blocks 415-a, 415-b, 415-c (e.g., bandwidths) of synchronization signal 420. For example, scrambling sequence $W_1$ may be associated with a different scrambling seed than scrambling sequence $W_2$. As a result, the synchronization sequence mapped to the first resource block 415-a of the synchronization signal 420 may be different from the synchronization sequence mapped to the second resource block 415-b or the third resource block 415-c of the synchronization signal 420. The use of different scrambling seeds (e.g., different scrambling sequences $W_0$, $W_1$, $W_2$) may result in the appearance of different synchronization sequences (e.g., different synchronization sequences mapped to different resource blocks 415-a, 415-b, 415-c). However, UEs capable of receiving more than one resource block at one time may be aware of the scrambling sequence (e.g., all scrambling sequences 410 used) and may combine the unscrambled base sequences obtained from multiple resource blocks 415-a, 415-b, 415-c of the synchronization signal 420.

In the example of FIG. 4, each resource block 415-a, 415-b, 415-c that makes up the synchronization signal 420 may include a base sequence $S_0$ scrambled by a different scrambling sequence. Synchronization signal 405 may be transmitted as multiple synchronization sequences mapped to multiple resource blocks 415. In one example, resource block 415-a may include the base synchronization sequence $S_0$ scrambled by scrambling sequence $W_0$. Resource block 415-b may include the base synchronization sequence $S_0$ scrambled by scrambling sequence $W_1$. Resource block 415-c may include the base synchronization sequence $S_0$ scrambled by scrambling sequence $W_2$. In one example, $W_0$, $W_1$, and $W_2$ may be different segments of the same scrambling sequence.

Scrambling sequences 410 may be applied to synchronization signals 605 to achieve desirable correlation properties on a per-resource block 415 (e.g., per synchronization segment) basis. In some cases, sequences may regularly be present and multi-resource block capability UEs and one resource block capability UEs may unscramble the sequence prior to detection. In other cases, scrambling sequences 410 may be optionally present, in which case UEs may blindly test hypothesis on the presence of the scrambling sequences 410. In effect, the overall synchronization signal 405 (e.g., PSS and SSS) may appear as a concatenation of multiple non-overlapping resource blocks 415, each with certain desirable properties for UEs with a capability to detect one resource block at one time. The PBCH may be conveyed by a separate channel, which may be decoded after timing and cell ID are detected.

Thus, in this example, the synchronization signal 420 includes a scrambled first synchronization sequence ($S_0W_0$) mapped to the first resource block 415-a, a scrambled second synchronization sequence ($S_0W_1$) which is based on the first synchronization sequence ($S_0$) and mapped to the second resource block **415-*b*, and a scrambled third synchronization sequence ($S_0W_2$) which is based on the first synchronization sequence ($S_0$) and mapped to the third resource block 310-*c***.

Figure 5:
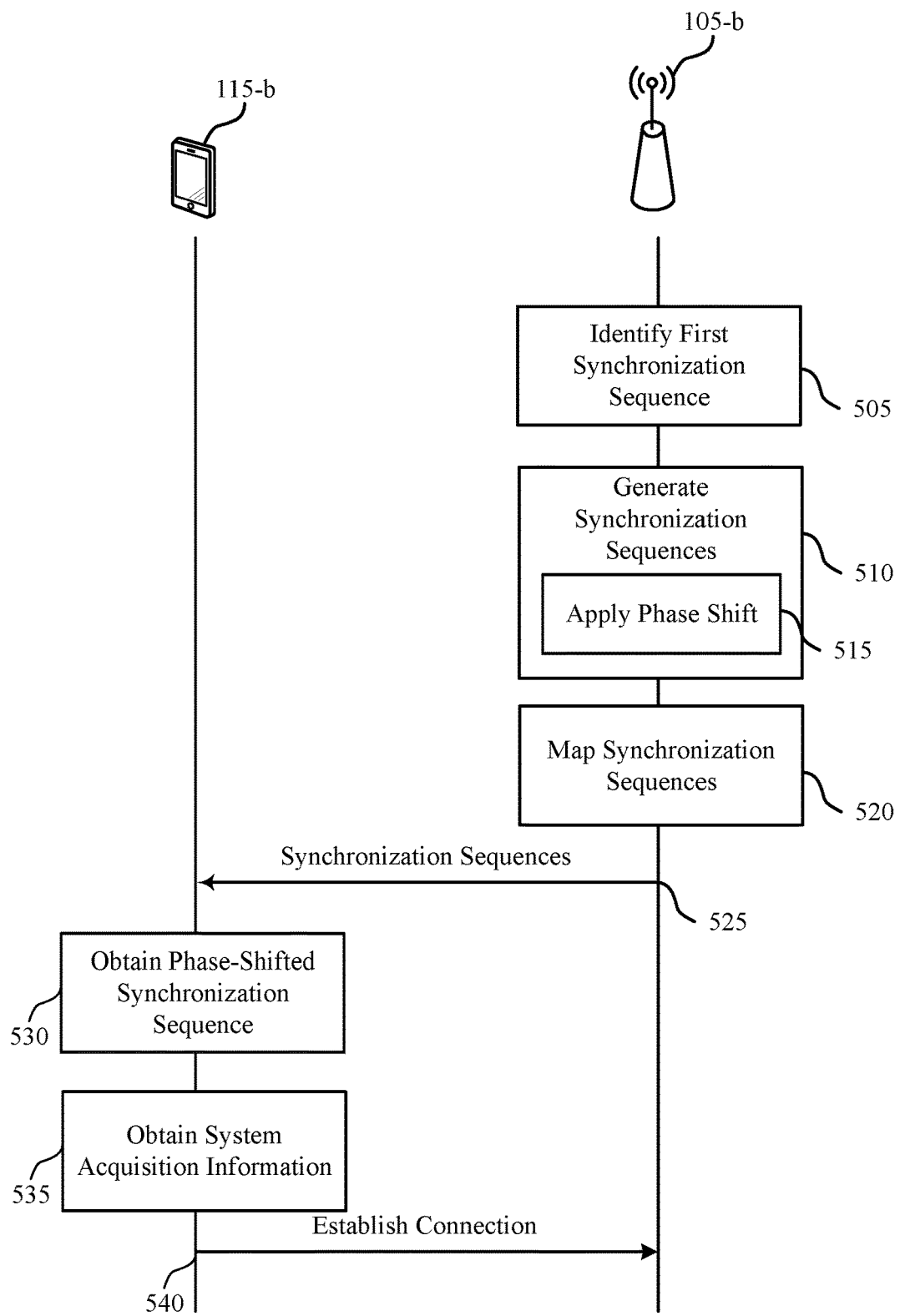
FIG. 5 illustrates an example of a process flow that supports synchronization channel and system acquisition for IoT communications in a shared spectrum in accordance with aspects of the present disclosure.

FIG. 5 illustrates an example of a process flow 500 that supports synchronization channel and system acquisition for IoT communications in a shared spectrum in accordance with various aspects of the present disclosure. In some examples, process flow 500 may implement aspects of wireless communication system 100. Process flow 500 may include a base station **105-*b* and a UE 115-*b*, which may represent aspects of techniques performed by a base station 105 or UE 115 as described with reference to FIGS. 1 through 4**.

At block 505, base station **105-*b* may identify a first synchronization sequence (e.g. a base synchronization sequence). In some examples, the first synchronization sequence may be used to convey a synchronization signal. For example, the first synchronization sequence may be used to convey a PSS or an SSS or a PBCH, or a combination thereof. In some cases, the base station 105-*b*** may operate in a regulatory domain with a regulation to use a minimum bandwidth for every transmission.

At block 510, base station **105-*b* may generate one or more additional synchronization sequences. For example, base station 105-*b* may generate a second synchronization sequence and a third synchronization sequence. The second synchronization sequence may be a phase shifted version of the first synchronization sequence and the third synchronization sequence may be a phase shifted version of the second synchronization sequence. For example, base station 105-*b* may apply a first phase shift to the first sequence and a second phase shift to the second sequence (at block 515**). In some cases, the first phase shift may be equal to the second phase shift. In some cases, the first phase shift is a multiple of the second phase shift. For example, if the base sequence is a PSS sequence, the second sequence may be a phase shifted version of the PSS sequence with a phase shift of theta, and the third sequence may be a phase shifted version of the PSS sequence with a phase shift of two times theta. In some other cases, the first phase shift and second phase shift may be different from the second phase shift. For example, if the base sequence is an SSS sequence, the second sequence may be a phase shifted version of the SSS sequence with a phase shift. The phase shift of the second sequence may be based on a payload of the SSS sequence.

At block 520, base station **105-*b* may map the one or more synchronization sequences to one or more resource blocks. For example, base station 105-*b*** may map the first synchronization sequence to a first resource block, a second synchronization sequence to a second resource block and a third synchronization sequence to a third resource block. The three resource blocks may be transmitted concurrently over a synchronization channel. For example, in the case of a PSS signal, the first resource block may include the base sequence for the PSS signal, the second resource block may include a phase shifted base sequence for the PSS signal and the third resource block may include another phase shifted base sequence for the PSS signal.

At block 525, base station **105-*b* may transmit the synchronization signal to the UE 115-*b*. In some cases the configured synchronization signal includes multiple synchronization sequences mapped to multiple resource blocks. The bandwidth allocated for the base station 105-*b* to transmit the synchronization signal may be divided into multiple resource blocks. Thus, multiple variations (phase shifted variations) of the base sequence are transmitted to UE 115-*b***.

At block 530, UE **115-*b* may apply a phase shift to the received synchronization sequence to obtain a phase-shifted version of the synchronization sequence. In one example, UE 115-*b* is capable of receiving one resource block at one time. In such cases, UE 115-*b* may receive either the base synchronization sequence mapped to the first resource block or the second synchronization sequence mapped to the second resource block or the third synchronization sequence mapped to the third resource block. Therefore, UE 115-*b* may correlate with one sequence irrespective of the resource block. By applying a phase shift to the received sequence, UE 115-*b* may be able to identify the base sequence and the associated phase shift. In some other cases, UE 115-*b* is capable of receiving more than one resource block at one time. In such cases, UE 115-*b* may receive multiple resource blocks and may determine the base sequence by decoding the received resource blocks. In the example of a multi-resource block UE 115-*b*, if the phase shift is known, then UE 115-*b* correlates against a longer sequence to identify a PSS sequence and an SSS sequence. If the phase shift is unknown, then multi-resource block UE 115-*b*** may detect multiple resource blocks individually and then perform a non-coherent combination of the resource blocks.

At block 535, UE **115-*b* may obtain system acquisition information for base station 105-*b*. For example, UE 115-*b* may detect a timing parameter and an identification parameter from the received sequence(s). In one example, UE 115-*b* may detect the timing by correlating against a PSS sequence and then processes an SSS sequence to get a cell ID. The SSS sequence may have the same phase shift or a different phase shift as compared to the PSS sequence. In some examples, the SSS payload may carry the cell ID and an resource block index. UE 115-*b* may then determine a cell specific reference signal (CRS) sequence using the timing parameter and the identification parameter. Once the UE 115-*b* (one resource block UE or multi-resource block UE) detects the cell-ID, UE 115-*b*** may determine the CRS sequence using the cell ID and the resource block index. The CRS sequence may be used for decoding PBCH.

At block 540, UE **115-*b* may establish a connection with the base station 105-*b*** using the obtained system acquisition information.

Figure 6:
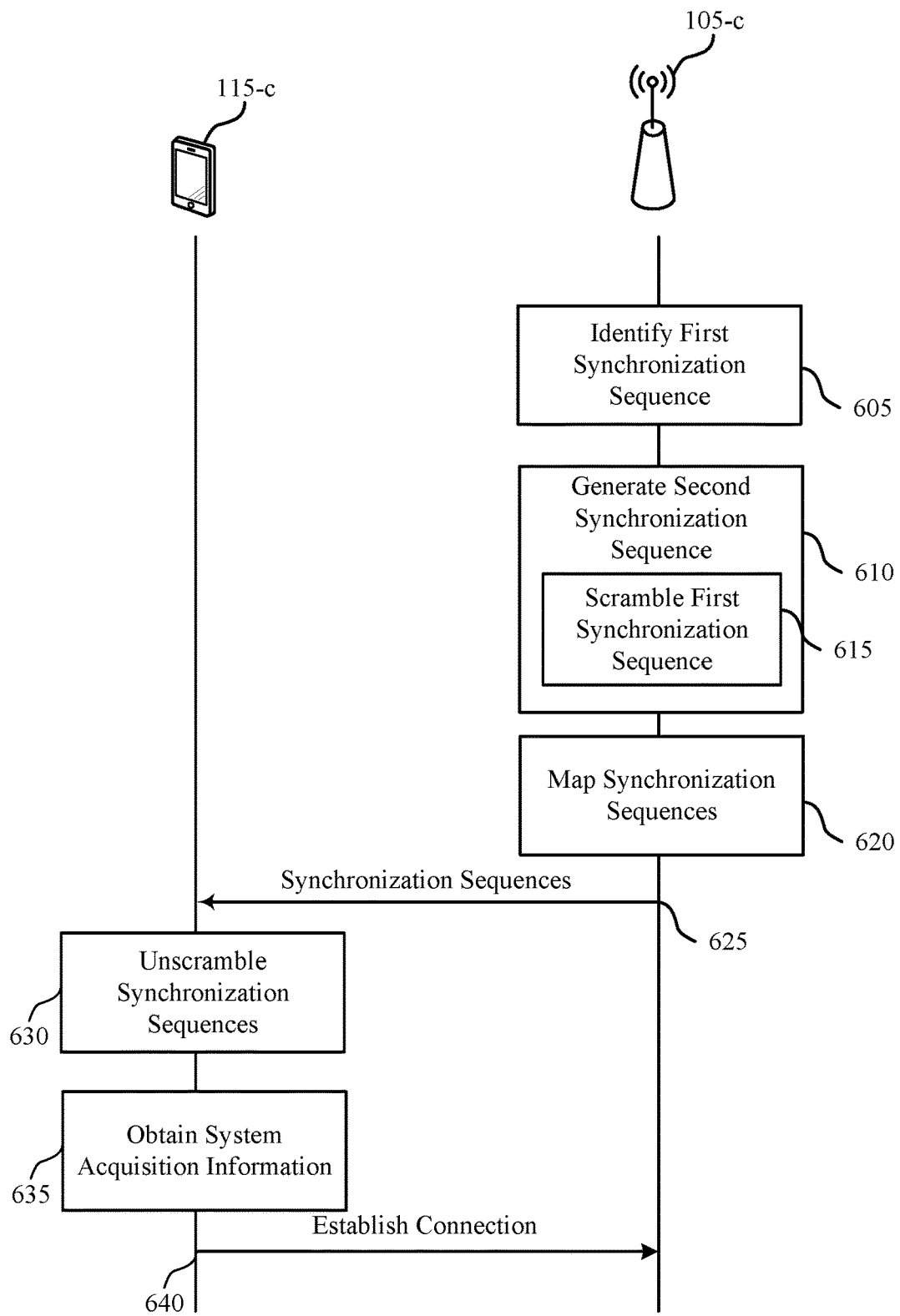
FIG. 6 illustrates an example of a process flow that supports synchronization channel and system acquisition for IoT communications in a shared spectrum in accordance with aspects of the present disclosure.

FIG. 6 illustrates an example of a process flow 600 that supports synchronization channel and system acquisition for IoT communications in a shared spectrum in accordance with various aspects of the present disclosure. In some examples, process flow 600 may implement aspects of wireless communication system 100. Process flow 600 may include a base station **105-*c* and a UE 115-*c*, which may represent aspects of techniques performed by a base station 105 or UE 115 as described with reference to FIGS. 1 through 5**.

At block 605, base station **105-*c* may identify a first synchronization sequence. The first synchronization sequence may be a base synchronization sequence to convey a synchronization signal. For example, the first synchronization sequence may be used to convey a PSS or an SSS or a PBCH, or a combination thereof. In some cases, the base station 105-*c* may operate in a regulatory domain with a regulation to use a minimum bandwidth for every transmission. For example, the bandwidth allocated to the synchronization signals may be divided into multiple resource blocks, and base station 105**-*c* may transmit variants of a base synchronization sequence over different resource blocks.

At block 610, base station 105-*c* may generate one or more synchronization sequences for one or more resource blocks. For example, base station 105-*c* may generate a second synchronization sequence and a third synchronization sequence. The second synchronization sequence may generated by scrambling the first synchronization sequence (at block 615) using a first scrambling sequence and the third synchronization sequence may be generated by scrambling the second synchronization sequence using a second scrambling sequence. For example, base station 105-*c* may scramble the first synchronization sequence using different scrambling sequences for different concurrent resource blocks within the bandwidth allocated to the synchronization signals. In some cases, the scrambling sequence comprises at least one of an m-sequence, a Zadoff-Chu sequence, a binary sequence with a constant amplitude, or a combination thereof.

At block 620, base station 105-*c* may map the one or more synchronization sequences to one or more resource blocks. For example, base station 105-*c* may map the first synchronization sequence to a first resource block, a second synchronization sequence to a second resource block and a third synchronization sequence to a third resource block. The resource blocks may be transmitted concurrently over a synchronization channel. For example, in the case of a PSS signal, the first resource block may include the base sequence for the PSS signal, the second resource block may include a scrambled PSS signal and the third resource block may include another scrambled PSS signal.

At block 625, base station 105-*c* may transmit the synchronization signal to the UE 115-*c*. In some cases (e.g., if the configured synchronization signal includes multiple synchronization sequences mapped to multiple resource blocks) base station 105-*c* may transmit multiple synchronization sequences to UE 115-*c*.

At block 630, UE 115-*c* may unscramble the base synchronization sequence using a first scrambling sequence and unscramble the second synchronization sequence using a second scrambling sequence. As discussed previously, the first scrambling sequence and the second scrambling sequence comprise an m-sequence, a Zadoff-Chu sequence, or a combination thereof. If UE 115-*c* has a capability to receive one resource block at one time, UE 115-*c* may correlate against a part of the sequence (e.g., UE 115-*c* may try several combinations as UE 115-*c* is not aware of which partial segment it is correlating against). The first scrambling sequence and the second scrambling sequence may possess a partial correlation with a select portion(s) of the base sequence. Thus the first scrambling sequence and the second scrambling sequence may retain desirable correlation properties and unique signature to convey the required information to UE 115-*c*.

At block 635, UE 115-*c* may obtain system acquisition information for base station 105-*c*. For example, UE 115-*c* may perform blind detection of the synchronization sequences using the scrambling sequences. UE 115-*c* may unscramble a synchronization sequence (received over a resource block) to identify the scrambling sequence. Upon identifying the scrambling sequence, UE 115-*c* (one resource block and multi-resource block) may perform a blind detection of the synchronization sequence. UE 115-*c* may then obtain system acquisition information based on synchronization sequence.

At block 640, UE 115-*c* may establish a connection with the base station 105-*c* using the obtained system acquisition information.

Figure 7:
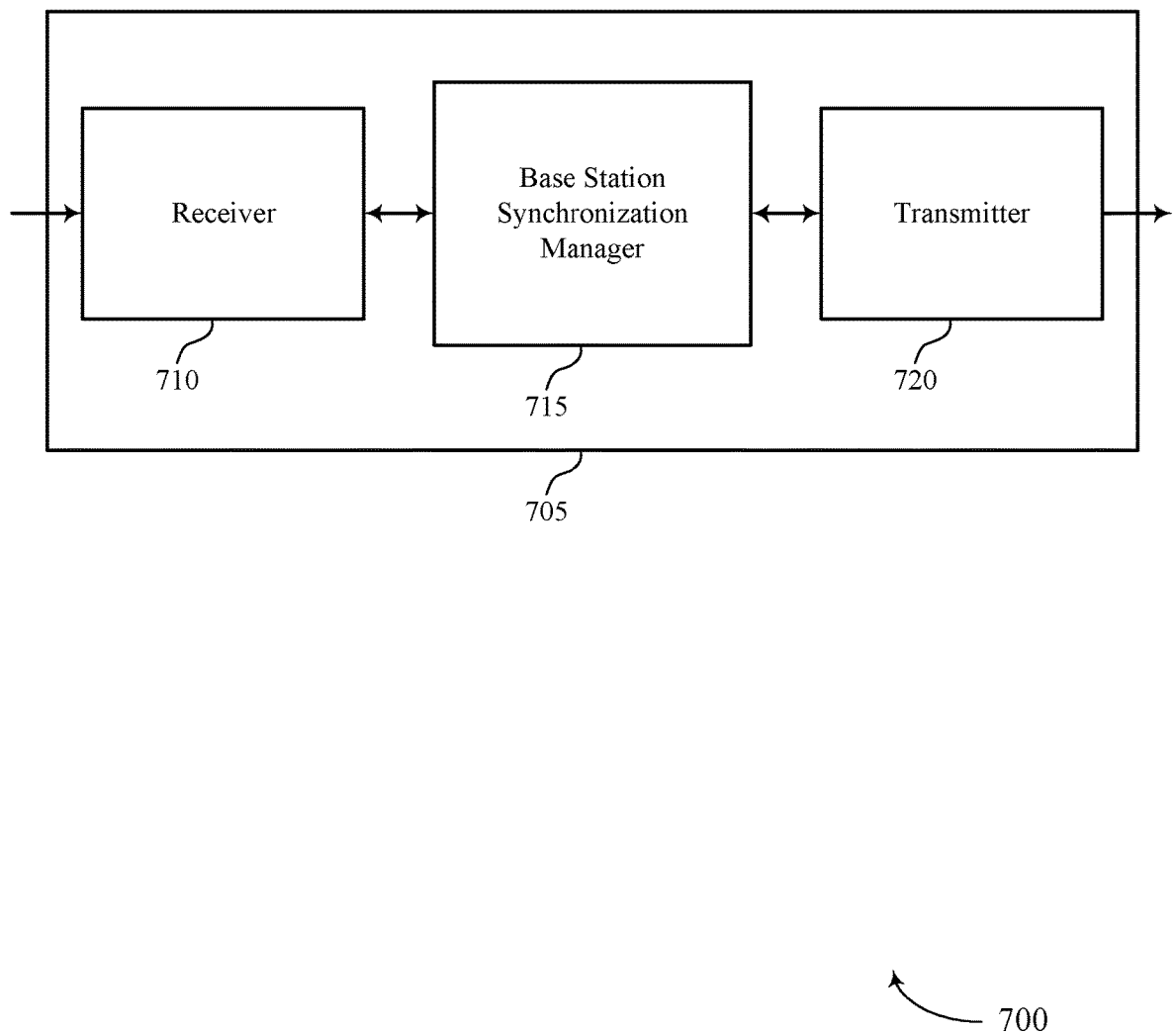
FIGS. 7 through 9 show block diagrams of a device that supports synchronization channel and system acquisition for IoT communications in a shared spectrum in accordance with aspects of the present disclosure.

FIG. 7 shows a block diagram 700 of a wireless device 705 that supports synchronization channel and system acquisition for IoT communications in a shared spectrum in accordance with aspects of the present disclosure. Wireless device 705 may be an example of aspects of a base station 105 as described herein. Wireless device 705 may include receiver 710, base station synchronization manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to synchronization channel and system acquisition for IoT communications in a shared spectrum, etc.). Information may be passed on to other components of the device. The receiver 710 may be an example of aspects of the transceiver 1035 described with reference to FIG. 10. The receiver 710 may utilize a single antenna or a set of antennas.

Base station synchronization manager 715 may be an example of aspects of the base station synchronization manager 1015 described with reference to FIG. 10.

Base station synchronization manager 715 and/or at least some of its various sub-components may be implemented in hardware, software executed by a processor, firmware, or any combination thereof. If implemented in software executed by a processor, the functions of the base station synchronization manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station synchronization manager 715 and/or at least some of its various sub-components may be physically located at various positions, including being distributed such that portions of functions are implemented at different physical locations by one or more physical devices. In some examples, base station synchronization manager 715 and/or at least some of its various sub-components may be a separate and distinct component in accordance with various aspects of the present disclosure. In other examples, base station synchronization manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station synchronization manager 715 may identify a first synchronization sequence (e.g. a base synchronization sequence), generate a second synchronization sequence based on the first synchronization sequence, and map the first synchronization sequence to a first resource block of a synchronization channel associated with a first frequency sub-band of a shared radio frequency spectrum band and the second synchronization sequence to a second resource block associated with a second frequency sub-band of the synchronization channel.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Transmitter 720 may transmit the first synchronization sequence and the second synchronization sequence concurrently over the synchronization channel using the first resource block and the second resource block according to the mapping, transmit the third synchronization sequence using the third resource block, and transmit the third synchronization sequence is concurrent with transmitting the first synchronization sequence and the second synchronization sequence.

Figure 8:
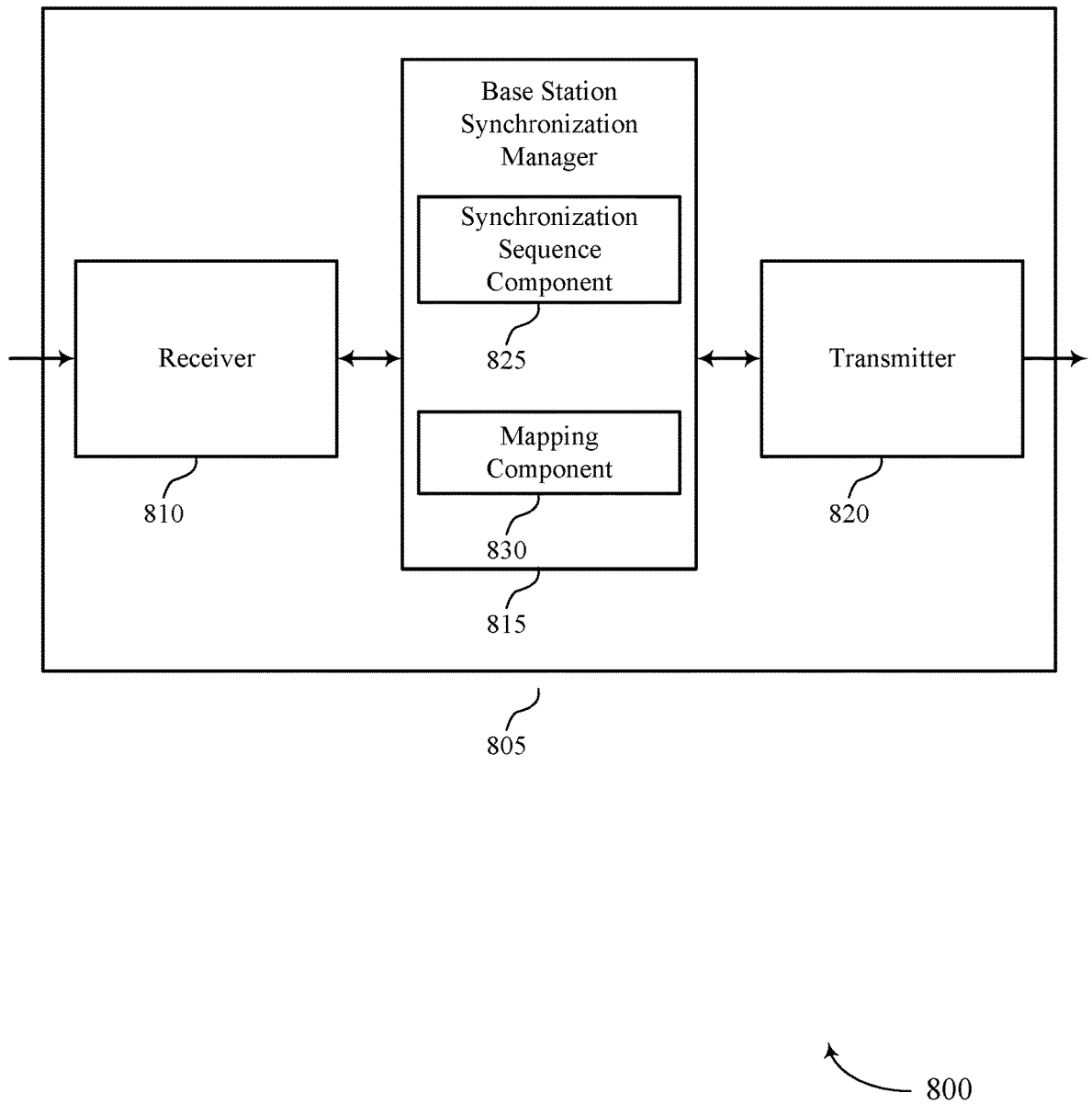

FIG. 8 shows a block diagram 800 of a wireless device 805 that supports synchronization channel and system acquisition for IoT communications in a shared spectrum in accordance with aspects of the present disclosure. Wireless device 805 may be an example of aspects of a wireless device 705 or a base station 105 as described with reference to FIG. 7. Wireless device 805 may include receiver 810, base station synchronization manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to synchronization channel and system acquisition for IoT communications in a shared spectrum, etc.). Information may be passed on to other components of the device. The receiver 810 may be an example of aspects of the transceiver 1035 described with reference to FIG. 10. The receiver 810 may utilize a single antenna or a set of antennas.

Base station synchronization manager 815 may be an example of aspects of the base station synchronization manager 1015 described with reference to FIG. 10. Base station synchronization manager 815 may also include synchronization sequence component 825 and mapping component 830.

Synchronization sequence component 825 may identify a first synchronization sequence (e.g. a base synchronization sequence), generate a second synchronization sequence based on the first synchronization sequence, and generate a third synchronization sequence by applying a second phase shift to the first synchronization sequence. The second phase shift may be different from the first phase shift. Synchronization sequence component 825 may further generate a third synchronization sequence by scrambling the first synchronization sequence using a second scrambling sequence.

Mapping component 830 may map the first synchronization sequence to a first resource block of a synchronization channel associated with a first frequency sub-band of a shared radio frequency spectrum band and the second synchronization sequence to a second resource block associated with a second frequency sub-band of the synchronization channel and map the third synchronization sequence to a third resource block of the synchronization channel.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
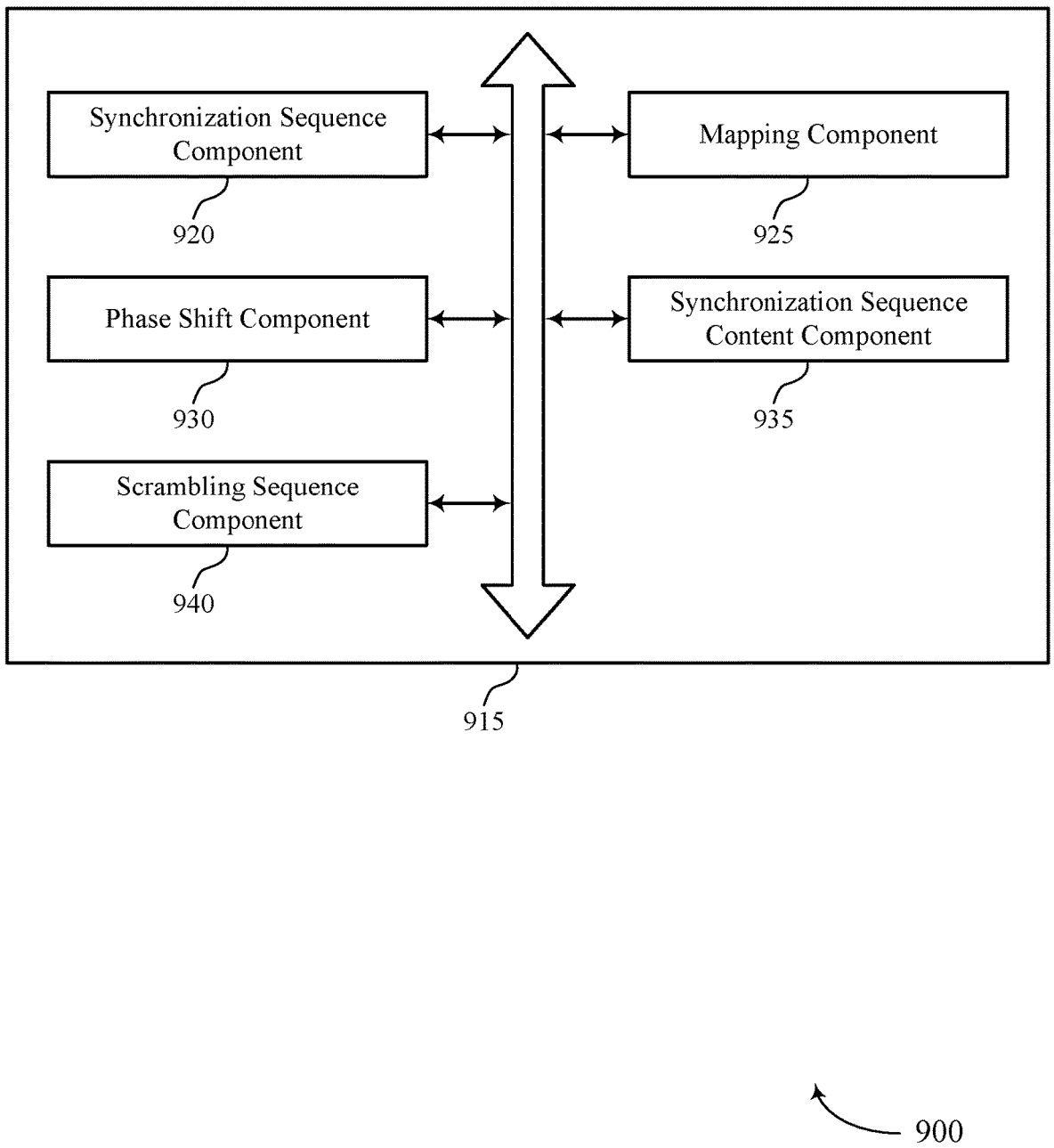

FIG. 9 shows a block diagram 900 of a base station synchronization manager 915 that supports synchronization channel and system acquisition for IoT communications in a shared spectrum in accordance with aspects of the present disclosure. The base station synchronization manager 915 may be an example of aspects of a base station synchronization manager 715, a base station synchronization manager 815, or a base station synchronization manager 1015 described with reference to FIGS. 7, 8, and 10. The base station synchronization manager 915 may include synchronization sequence component 920, mapping component 925, phase shift component 930, synchronization sequence content component 935, and scrambling sequence component 940. Each of these modules may communicate, directly or indirectly, with one another (e.g., via one or more buses).

Synchronization sequence component 920 may identify a first synchronization sequence (e.g. a base synchronization sequence), generate a second synchronization sequence based on the first synchronization sequence, and generate a third synchronization sequence by applying a second phase shift to the first synchronization sequence. In some cases, the second phase shift is different from the first phase shift. Synchronization sequence component 920 may generate a third synchronization sequence by scrambling the first synchronization sequence using a second scrambling sequence.

Mapping component 925 may map the first synchronization sequence to a first resource block of a synchronization channel associated with a first frequency sub-band of a shared radio frequency spectrum band and the second synchronization sequence to a second resource block associated with a second frequency sub-band of the synchronization channel and map the third synchronization sequence to a third resource block of the synchronization channel.

Phase shift component 930 may apply a first phase shift to the first synchronization sequence and a second phase shift to the second synchronization sequence. In some cases, the second phase shift is a multiple of the first phase shift. In some cases, the first phase shift is different than the second phase shift, and the second phase shift is based on a payload of an SSS. In some cases, the first phase shift is same as the second phase shift. In some cases, the first phase shift is based on a bandwidth of the shared radio frequency spectrum band.

Synchronization sequence content component 935 may generate the second synchronization sequence based on a content of the PSS, the SSS, or the PBCH. In some cases, the first synchronization sequence includes at least one of a PSS, a SSS, a PBCH, or combinations thereof.

Scrambling sequence component 940 may generate the second synchronization sequence by scrambling the first synchronization sequence using a first scrambling sequence. In some cases, the first scrambling sequence includes at least one of an m-sequence, a Zadoff-Chu sequence, or a combination thereof.

Figure 10:
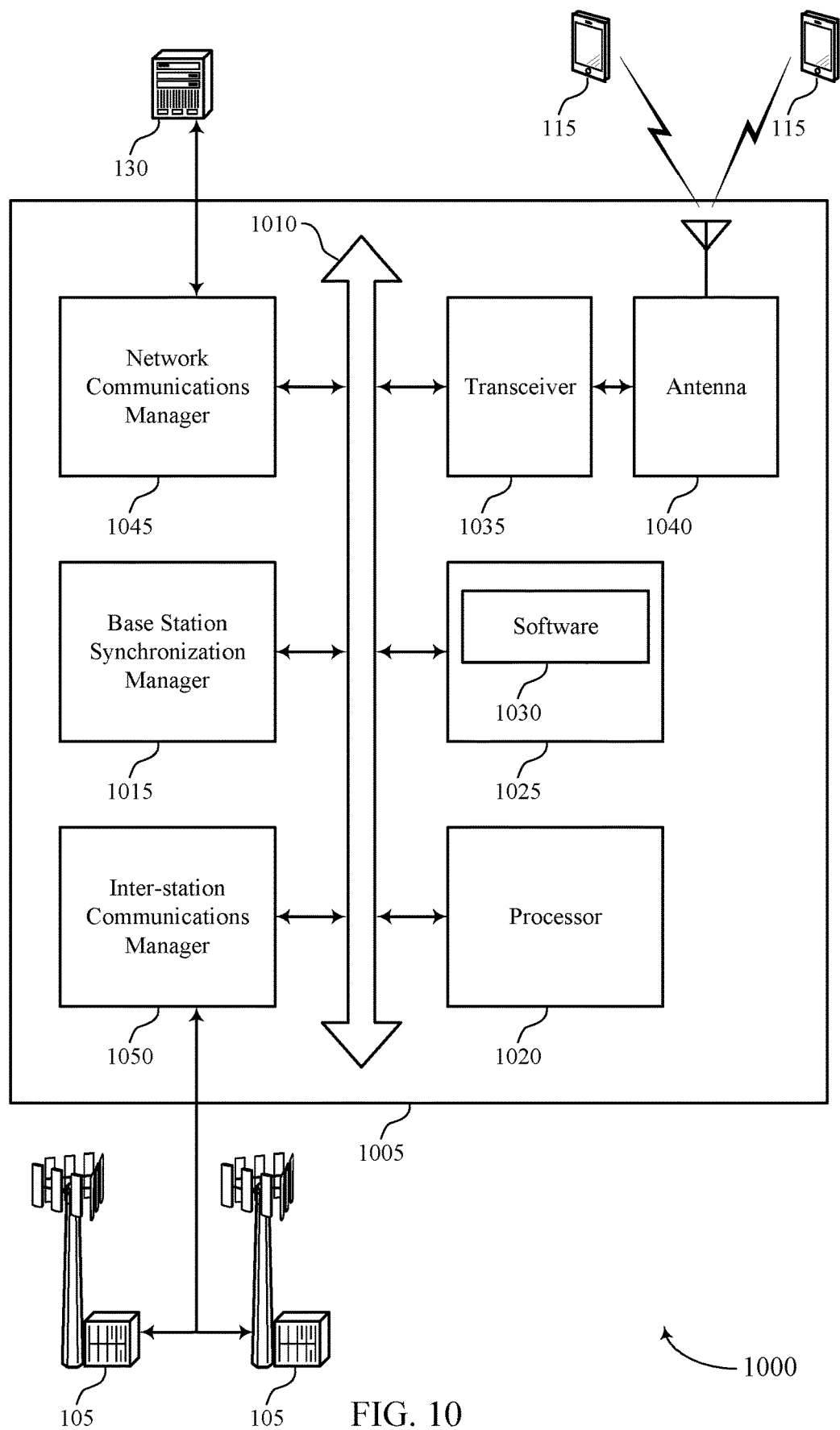
FIG. 10 illustrates a block diagram of a system including a base station that supports synchronization channel and system acquisition for IoT communications in a shared spectrum in accordance with aspects of the present disclosure.

FIG. 10 shows a diagram of a system 1000 including a device 1005 that supports synchronization channel and system acquisition for IoT communications in a shared spectrum in accordance with aspects of the present disclosure. Device 1005 may be an example of or include the components of wireless device 705, wireless device 805, or a base station 105 as described above, e.g., with reference to FIGS. 7 and 8. Device 1005 may include components for bi-directional voice and data communications including components for transmitting and receiving communications, including base station synchronization manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more UEs 115.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting synchronization channel and system acquisition for IoT communications in a shared spectrum).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support synchronization channel and system acquisition for IoT communications in a shared spectrum. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an LTE/LTE-A wireless communication network technology to provide communication between base stations 105.

Figure 11:
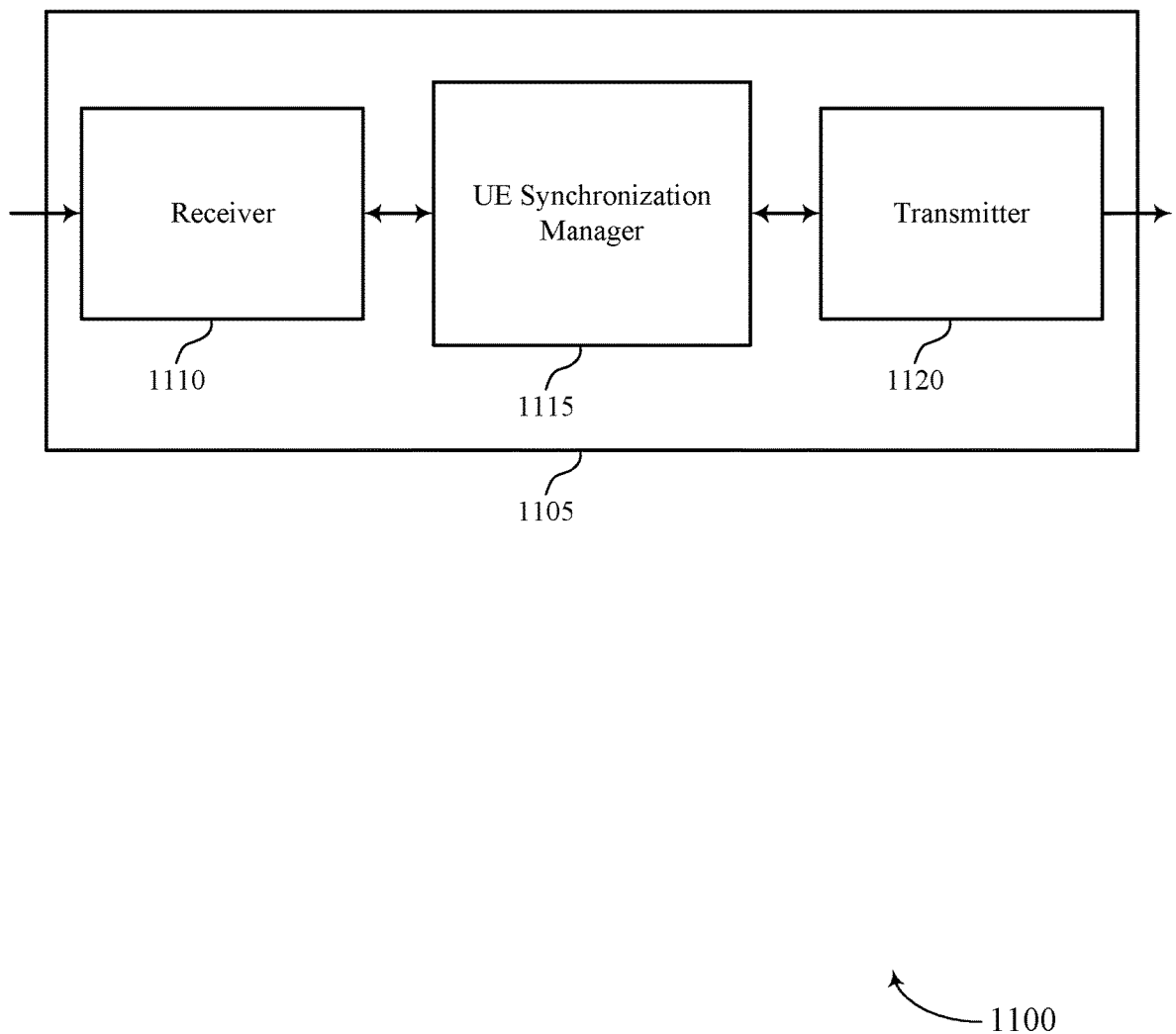
FIGS. 11 through 13 show block diagrams of a device that supports synchronization channel and system acquisition for IoT communications in a shared spectrum in accordance with aspects of the present disclosure.

FIG. 11 shows a block diagram 1100 of a wireless device 1105 that supports synchronization channel and system acquisition for IoT communications in a shared spectrum in accordance with aspects of the present disclosure. Wireless device 1105 may be an example of aspects of a UE 115 as described herein. Wireless device 1105 may include receiver 1110, UE synchronization manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to synchronization channel and system acquisition for IoT communications in a shared spectrum, etc.). Information may be passed on to other components of the device. The receiver 1110 may be an example of aspects of the transceiver 1435 described with reference to FIG. 14. The receiver 1110 may utilize a single antenna or a set of antennas.

UE synchronization manager 1115 may be an example of aspects of the UE synchronization manager 1415 described with reference to FIG. 14.

UE synchronization manager 1115 and/or at least some of its various sub-components may be implemented in hardware, software executed by a processor, firmware, or any combination thereof. If implemented in software executed by a processor, the functions of the UE synchronization manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE synchronization manager 1115 and/or at least some of its various sub-components may be physically located at various positions, including being distributed such that portions of functions are implemented at different physical locations by one or more physical devices. In some examples, UE synchronization manager 1115 and/or at least some of its various sub-components may be a separate and distinct component in accordance with various aspects of the present disclosure. In other examples, UE synchronization manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE synchronization manager 1115 may receive a first synchronization sequence over a synchronization channel using a first resource block associated with a first frequency sub-band of a shared radio frequency spectrum band, receive a second synchronization sequence over the synchronization channel using a second resource block associated with a second frequency sub-band of the shared radio frequency spectrum band, where the first resource block and the second resource block are concurrent in time, obtain system acquisition information for a base station based on a combination of the first synchronization sequence and the second synchronization sequence, and establish a connection with the base station using the obtained system acquisition information.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
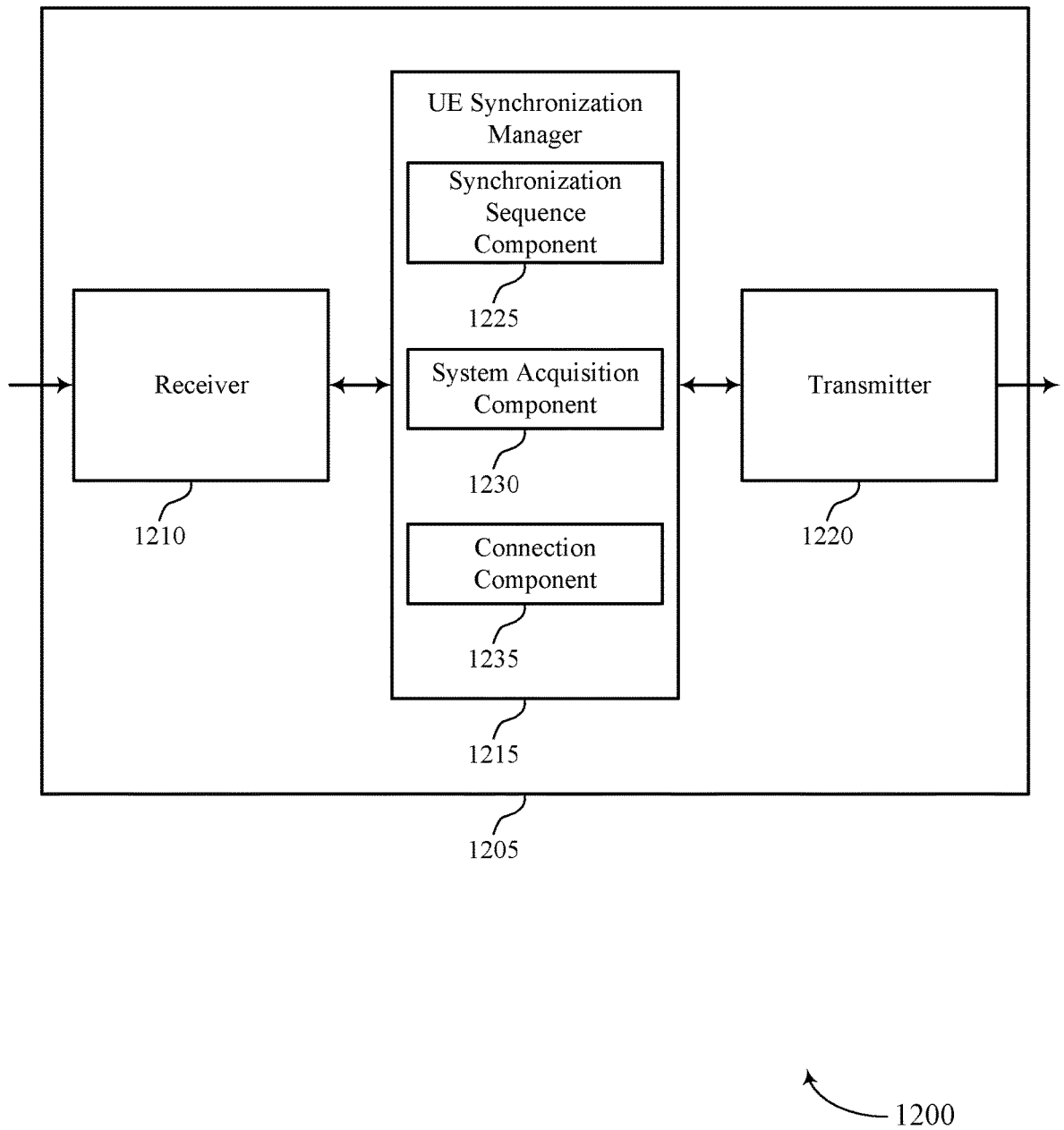

FIG. 12 shows a block diagram 1200 of a wireless device 1205 that supports synchronization channel and system acquisition for IoT communications in a shared spectrum in accordance with aspects of the present disclosure. Wireless device 1205 may be an example of aspects of a wireless device 1105 or a UE 115 as described with reference to FIG. 11. Wireless device 1205 may include receiver 1210, UE synchronization manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to synchronization channel and system acquisition for IoT communications in a shared spectrum, etc.). Information may be passed on to other components of the device. The receiver 1210 may be an example of aspects of the transceiver 1435 described with reference to FIG. 14. The receiver 1210 may utilize a single antenna or a set of antennas.

UE synchronization manager 1215 may be an example of aspects of the UE synchronization manager 1415 described with reference to FIG. 14. UE synchronization manager 1215 may also include synchronization sequence component 1225, system acquisition component 1230, and connection component 1235.

Synchronization sequence component 1225 may receive a first synchronization sequence over a synchronization channel using a first resource block associated with a first frequency sub-band of a shared radio frequency spectrum band, and receive a second synchronization sequence over the synchronization channel using a second resource block associated with a second frequency sub-band of the shared radio frequency spectrum band. In some cases, the first resource block and the second resource block are concurrent in time. Synchronization sequence component 1225 may receive a third synchronization sequence over the synchronization channel using a third resource block associated with a third sub-band of the shared radio frequency spectrum, where the first resource block, the second resource block, and the third resource block are concurrent in time. In some cases, the combination of the first synchronization sequence and the second synchronization sequence includes a combination of the first synchronization sequence, the second synchronization sequence, and the third synchronization sequence.

System acquisition component 1230 may obtain system acquisition information for a base station based on a combination of the first synchronization sequence and the second synchronization sequence. In some cases, the combination of the first synchronization sequence and the second synchronization sequence includes a sum of the first synchronization sequence, the phase-shifted version of the second synchronization sequence, and the phase-shifted version of the third synchronization sequence. In some cases, the combination of the first synchronization sequence and the second synchronization sequence includes a sum of the first synchronization sequence and the phase-shifted version of the second synchronization sequence. In some cases, obtaining the system acquisition information for the base station includes: detecting a timing parameter based on a content of the PSS.

Connection component 1235 may establish a connection with the base station using the obtained system acquisition information.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
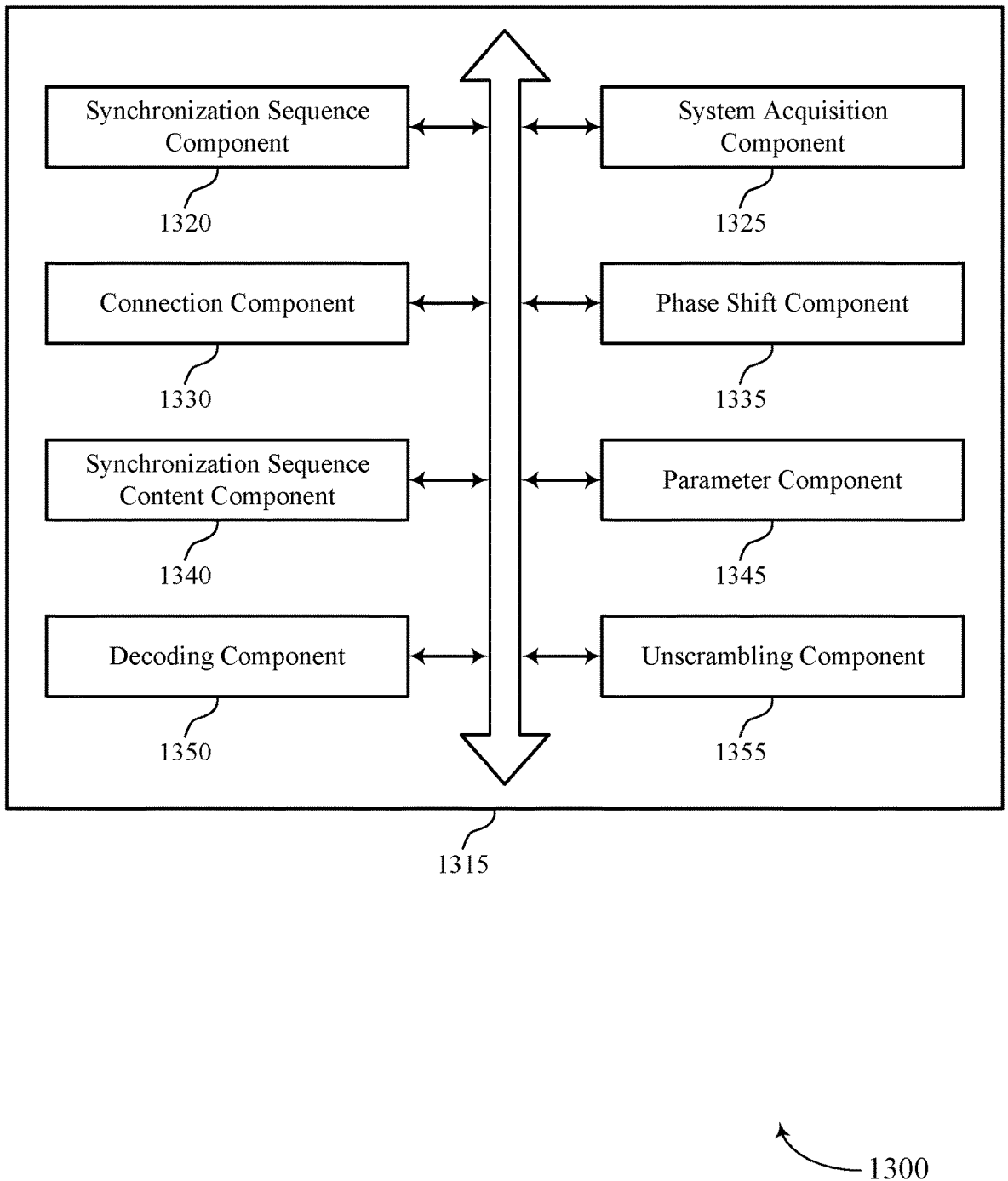

FIG. 13 shows a block diagram 1300 of a UE synchronization manager 1315 that supports synchronization channel and system acquisition for IoT communications in a shared spectrum in accordance with aspects of the present disclosure. The UE synchronization manager 1315 may be an example of aspects of a UE synchronization manager 1415 described with reference to FIGS. 11, 12, and 14. The UE synchronization manager 1315 may include synchronization sequence component 1320, system acquisition component 1325, connection component 1330, phase shift component 1335, synchronization sequence content component 1340, parameter component 1345, decoding component 1350, and unscrambling component 1355. Each of these modules may communicate, directly or indirectly, with one another (e.g., via one or more buses).

Synchronization sequence component 1320 may receive a first synchronization sequence over a synchronization channel using a first resource block associated with a first frequency sub-band of a shared radio frequency spectrum band, receive a second synchronization sequence over the synchronization channel using a second resource block associated with a second frequency sub-band of the shared radio frequency spectrum band. In some cases, the first resource block and the second resource block are concurrent in time. Synchronization sequence component 1320 may receive a third synchronization sequence over the synchronization channel using a third resource block associated with a third sub-band of the shared radio frequency spectrum, where the first resource block, the second resource block, and the third resource block are concurrent in time. In some cases, the combination of the first synchronization sequence and the second synchronization sequence includes a combination of the first synchronization sequence, the second synchronization sequence, and the third synchronization sequence.

System acquisition component 1325 may obtain system acquisition information for a base station based on a combination of the first synchronization sequence and the second synchronization sequence and where the combination of the first synchronization sequence and the second synchronization sequence includes a sum of the first synchronization sequence, the phase-shifted version of the second synchronization sequence, and the phase-shifted version of the third synchronization sequence. In some cases, the combination of the first synchronization sequence and the second synchronization sequence includes a sum of the first synchronization sequence and the phase-shifted version of the second synchronization sequence. In some cases, obtaining the system acquisition information for the base station includes: detecting a timing parameter based on a content of the PSS.

Connection component 1330 may establish a connection with the base station using the obtained system acquisition information.

Phase shift component 1335 may apply a second phase shift to the third synchronization sequence to obtain a phase-shifted version of the third synchronization sequence.

In some cases, Phase shift component 1335 may apply a first phase shift to the second synchronization sequence to obtain a phase-shifted version of the second synchronization sequence. In some cases, the second phase shift is a multiple of the first phase shift. In some cases, the first phase shift is different than the second phase shift, and the second phase shift is based on a payload of the SSS. In some cases, the first phase shift is based on a bandwidth of the shared radio frequency spectrum band.

Synchronization sequence content component 1340 may identify the first synchronization sequence. In some cases, the first synchronization sequence includes at least one of a PSS, a SSS, a PBCH, or combinations thereof. In some cases, the second synchronization sequence is based on a content of the PSS, the SSS, or the PBCH.

Parameter component 1345 may detect an identification parameter based on a payload of the SSS and determine a CRS sequence based on the timing parameter and the identification parameter.

Decoding component 1350 may decode the PBCH using the CRS sequence.

Unscrambling component 1355 may unscramble the third synchronization sequence using a third scrambling sequence. In some cases, unscrambling component 1355 may unscramble the first synchronization sequence using a first scrambling sequence and unscrambling the second synchronization sequence using a second scrambling sequence. In some cases, the first scrambling sequence and the second scrambling sequence include at least one of: an m-sequence, a Zadoff-Chu sequence, or a combination thereof. In some cases, unscrambling component 1355 may perform a blind detection of the third synchronization sequence using the first scrambling sequence, the second scrambling sequence, and the third scrambling sequence.

Figure 14:
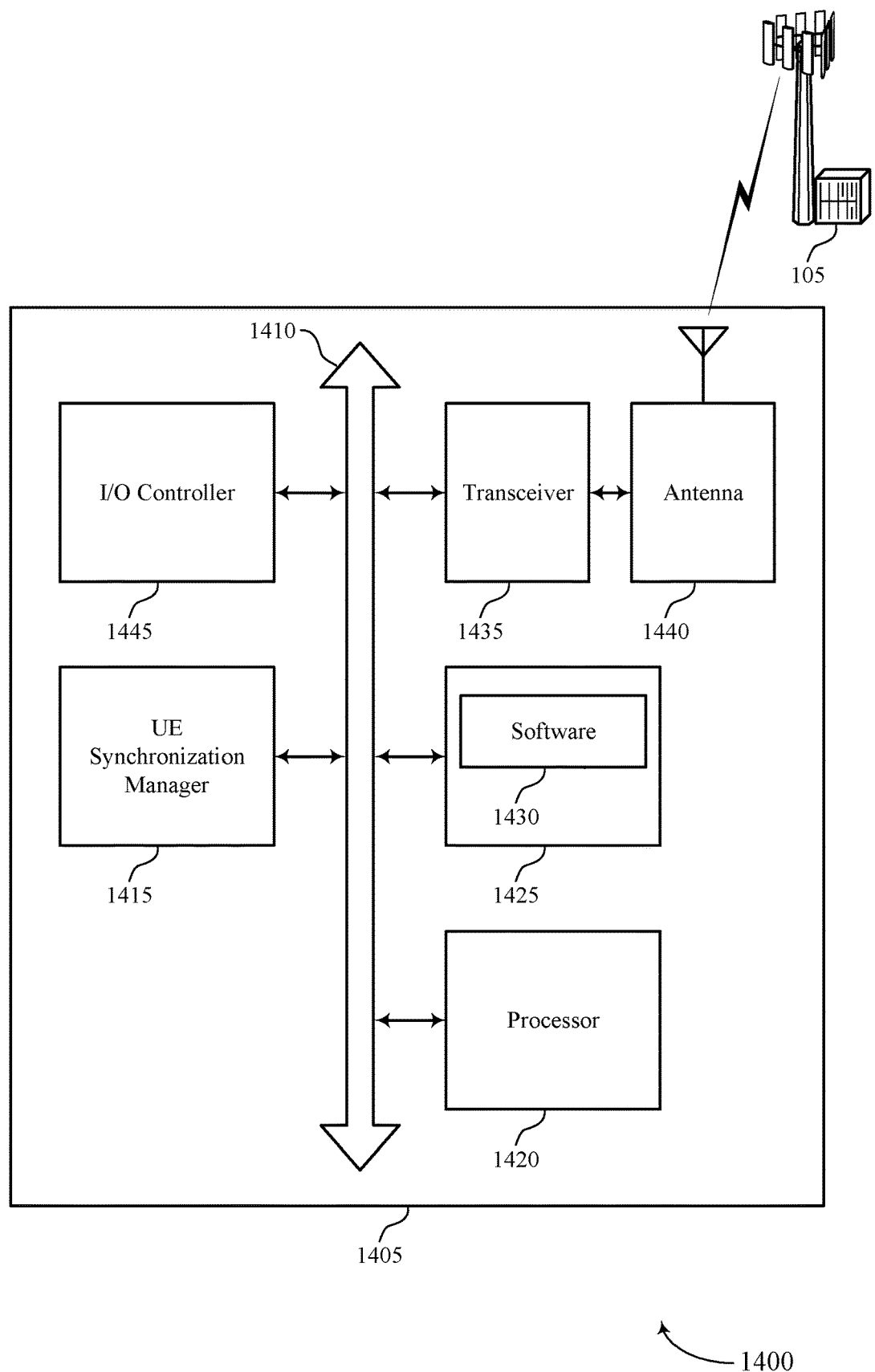
FIG. 14 illustrates a block diagram of a system including a UE that supports synchronization channel and system acquisition for IoT communications in a shared spectrum in accordance with aspects of the present disclosure.

FIG. 14 shows a diagram of a system 1400 including a device 1405 that supports synchronization channel and system acquisition for IoT communications in a shared spectrum in accordance with aspects of the present disclosure. Device 1405 may be an example of or include the components of UE 115 as described above, e.g., with reference to FIG. 1. Device 1405 may include components for bi-directional voice and data communications including components for transmitting and receiving communications, including UE synchronization manager 1415, processor 1420, memory 1425, software 1430, transceiver 1435, antenna 1440, and I/O controller 1445. These components may be in electronic communication via one or more buses (e.g., bus 1410). Device 1405 may communicate wirelessly with one or more base stations 105.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting synchronization channel and system acquisition for IoT communications in a shared spectrum).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support synchronization channel and system acquisition for IoT communications in a shared spectrum. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system. In other cases, I/O controller 1445 may represent or interact with a modem, a keyboard, a mouse, a touchscreen, or a similar device. In some cases, I/O controller 1445 may be implemented as part of a processor. In some cases, a user may interact with device 1405 via I/O controller 1445 or via hardware components controlled by I/O controller 1445.

Figure 15:
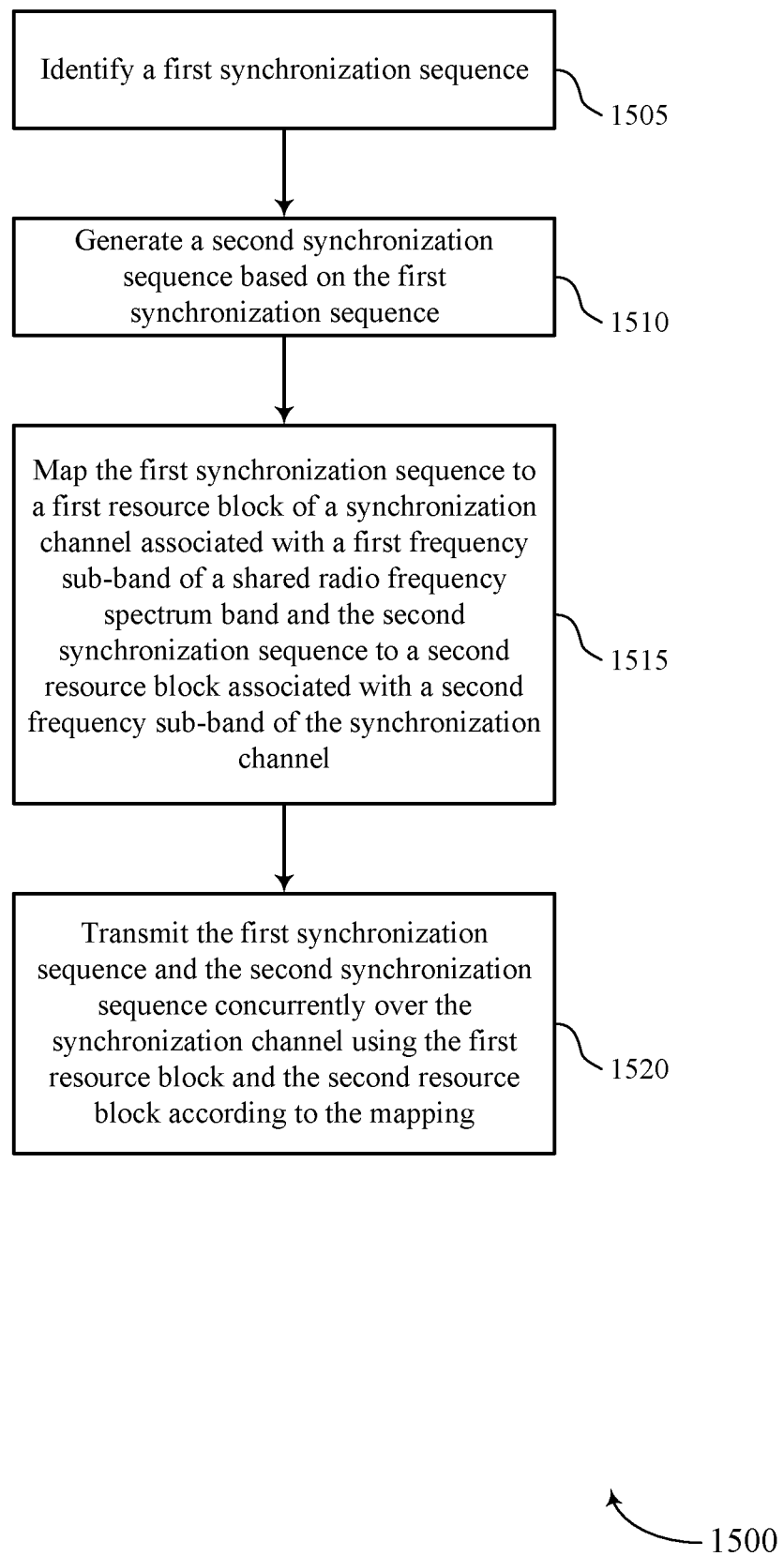
FIGS. 15 through 18 illustrate methods for synchronization channel and system acquisition for IoT communications in a shared spectrum in accordance with aspects of the present disclosure.

FIG. 15 shows a flowchart illustrating a method 1500 for synchronization channel and system acquisition for IoT communications in a shared spectrum in accordance with aspects of the present disclosure. The operations of method 1500 may be implemented by a base station 105 or its components as described herein. For example, the operations of method 1500 may be performed by a base station synchronization manager as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may identify a first synchronization sequence. The operations of block 1505 may be performed according to the methods described herein. In certain examples, aspects of the operations of block 1505 may be performed by a synchronization sequence component as described with reference to FIGS. 7 through 10.

At block 1510 the base station 105 may generate a second synchronization sequence based on the first synchronization sequence. The operations of block 1510 may be performed according to the methods described herein. In certain examples, aspects of the operations of block 1510 may be performed by a synchronization sequence component as described with reference to FIGS. 7 through 10.

At block 1515 the base station 105 may map the first synchronization sequence to a first resource block of a synchronization channel associated with a first frequency sub-band of a shared radio frequency spectrum band and the second synchronization sequence to a second resource block associated with a second frequency sub-band of the synchronization channel. The operations of block 1515 may be performed according to the methods described herein. In certain examples, aspects of the operations of block 1515 may be performed by a mapping component as described with reference to FIGS. 7 through 10.

At block 1520 the base station 105 may transmit the first synchronization sequence and the second synchronization sequence concurrently over the synchronization channel using the first resource block and the second resource block according to the mapping. The operations of block 1520 may be performed according to the methods described herein. In certain examples, aspects of the operations of block 1520 may be performed by a transmitter as described with reference to FIGS. 7 through 10.

Figure 16:
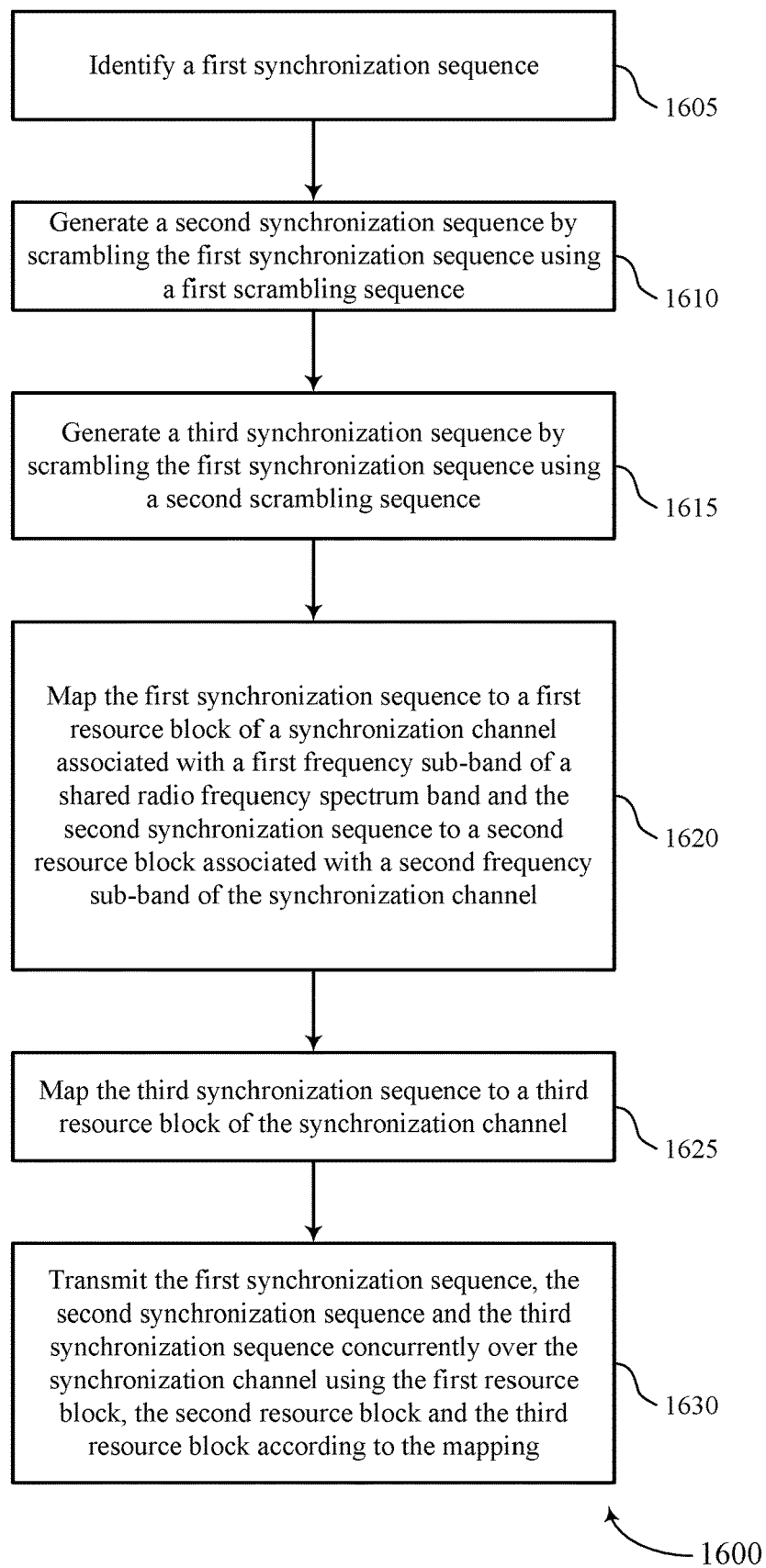

FIG. 16 shows a flowchart illustrating a method 1600 for synchronization channel and system acquisition for IoT communications in a shared spectrum in accordance with aspects of the present disclosure. The operations of method 1600 may be implemented by a base station 105 or its components as described herein. For example, the operations of method 1600 may be performed by a base station synchronization manager as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may identify a first synchronization sequence. The operations of block 1605 may be performed according to the methods described herein. In certain examples, aspects of the operations of block 1605 may be performed by a synchronization sequence component as described with reference to FIGS. 7 through 10.

At block 1610 the base station 105 may generate a second synchronization sequence using a first scrambling sequence. The operations of block 1610 may be performed according to the methods described herein. In certain examples, aspects of the operations of block 1610 may be performed by a synchronization sequence component as described with reference to FIGS. 7 through 10.

At block 1615 the base station 105 may generate a third synchronization sequence by scrambling the first synchronization sequence using a second scrambling sequence. The operations of block 1615 may be performed according to the methods described herein. In certain examples, aspects of the operations of block 1615 may be performed by a synchronization sequence component as described with reference to FIGS. 7 through 10.

At block 1620 the base station 105 may map the first synchronization sequence to a first resource block of a synchronization channel associated with a first frequency sub-band of a shared radio frequency spectrum band and the second synchronization sequence to a second resource block associated with a second frequency sub-band of the synchronization channel. The operations of block 1620 may be performed according to the methods described herein. In certain examples, aspects of the operations of block 1620 may be performed by a mapping component as described with reference to FIGS. 7 through 10.

At block 1625 the base station 105 may map the third synchronization sequence to a third resource block of the synchronization channel. The operations of block 1625 may be performed according to the methods described herein. In certain examples, aspects of the operations of block 1625 may be performed by a mapping component as described with reference to FIGS. 7 through 10.

At block 1630 the base station 105 may transmit the first synchronization sequence and the second synchronization sequence concurrently over the synchronization channel using the first resource block and the second resource block according to the mapping. The operations of block 1630 may be performed according to the methods described herein. In certain examples, aspects of the operations of block 1630 may be performed by a transmitter as described with reference to FIGS. 7 through 10.

Figure 17:
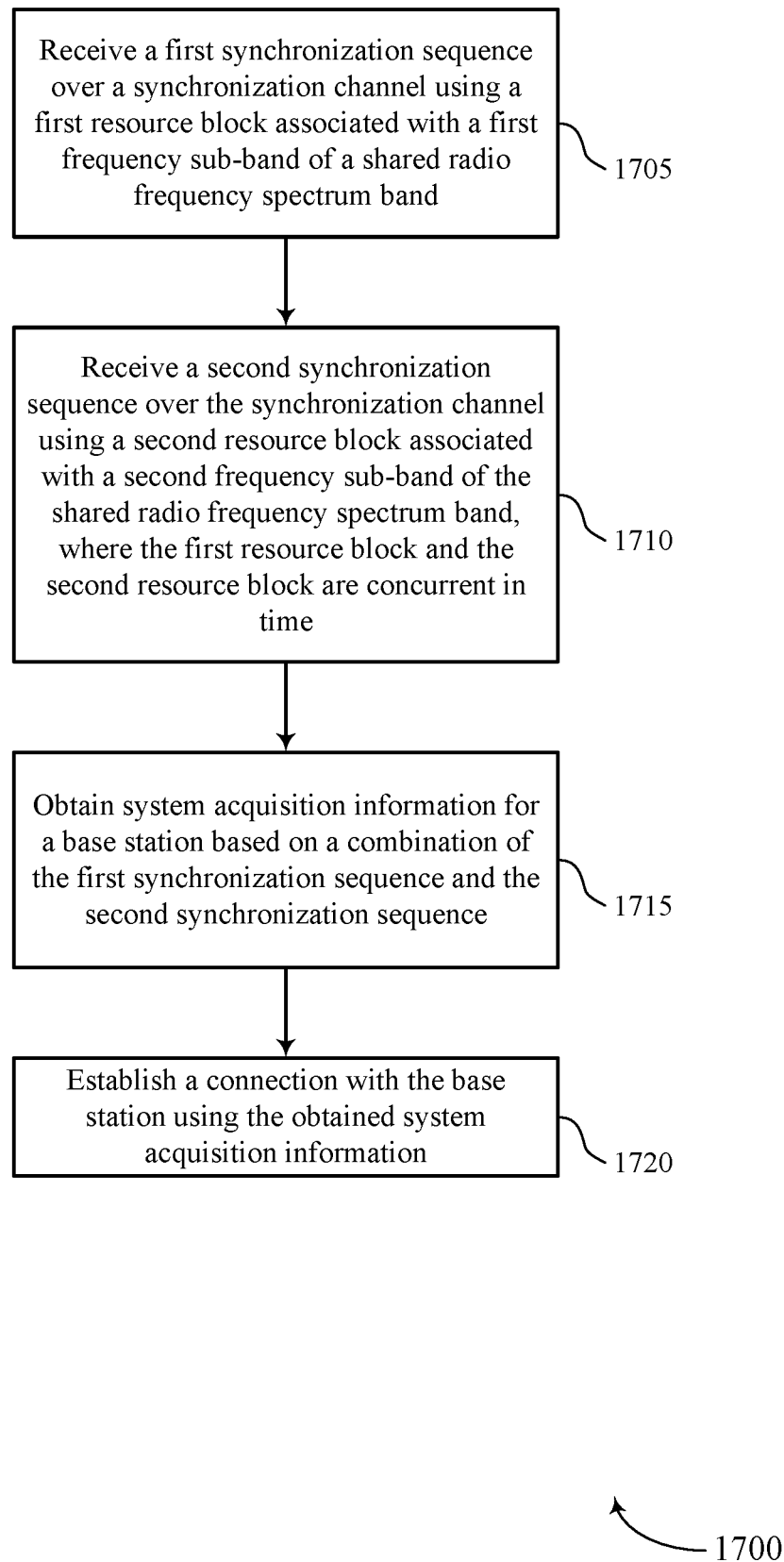

FIG. 17 shows a flowchart illustrating a method 1700 for synchronization channel and system acquisition for IoT communications in a shared spectrum in accordance with aspects of the present disclosure. The operations of method 1700 may be implemented by a UE 115 or its components as described herein. For example, the operations of method 1700 may be performed by a UE synchronization manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive a first synchronization sequence over a synchronization channel using a first resource block associated with a first frequency sub-band of a shared radio frequency spectrum band. The operations of block 1705 may be performed according to the methods described herein. In certain examples, aspects of the operations of block 1705 may be performed by a synchronization sequence component as described with reference to FIGS. 11 through 14.

At block 1710 the UE 115 may receive a second synchronization sequence over the synchronization channel using a second resource block associated with a second frequency sub-band of the shared radio frequency spectrum band. In some cases, the first resource block and the second resource block are concurrent in time. The operations of block 1710 may be performed according to the methods described herein. In certain examples, aspects of the operations of block 1710 may be performed by a synchronization sequence component as described with reference to FIGS. 11 through 14.

At block 1715 the UE 115 may obtain system acquisition information for a base station based on a combination of the first synchronization sequence and the second synchronization sequence. The operations of block 1715 may be performed according to the methods described herein. In certain examples, aspects of the operations of block 1715 may be performed by a system acquisition component as described with reference to FIGS. 11 through 14.

At block 1720 the UE 115 may establish a connection with the base station using the obtained system acquisition information. The operations of block 1720 may be performed according to the methods described herein. In certain examples, aspects of the operations of block 1720 may be performed by a connection component as described with reference to FIGS. 11 through 14.

Figure 18:
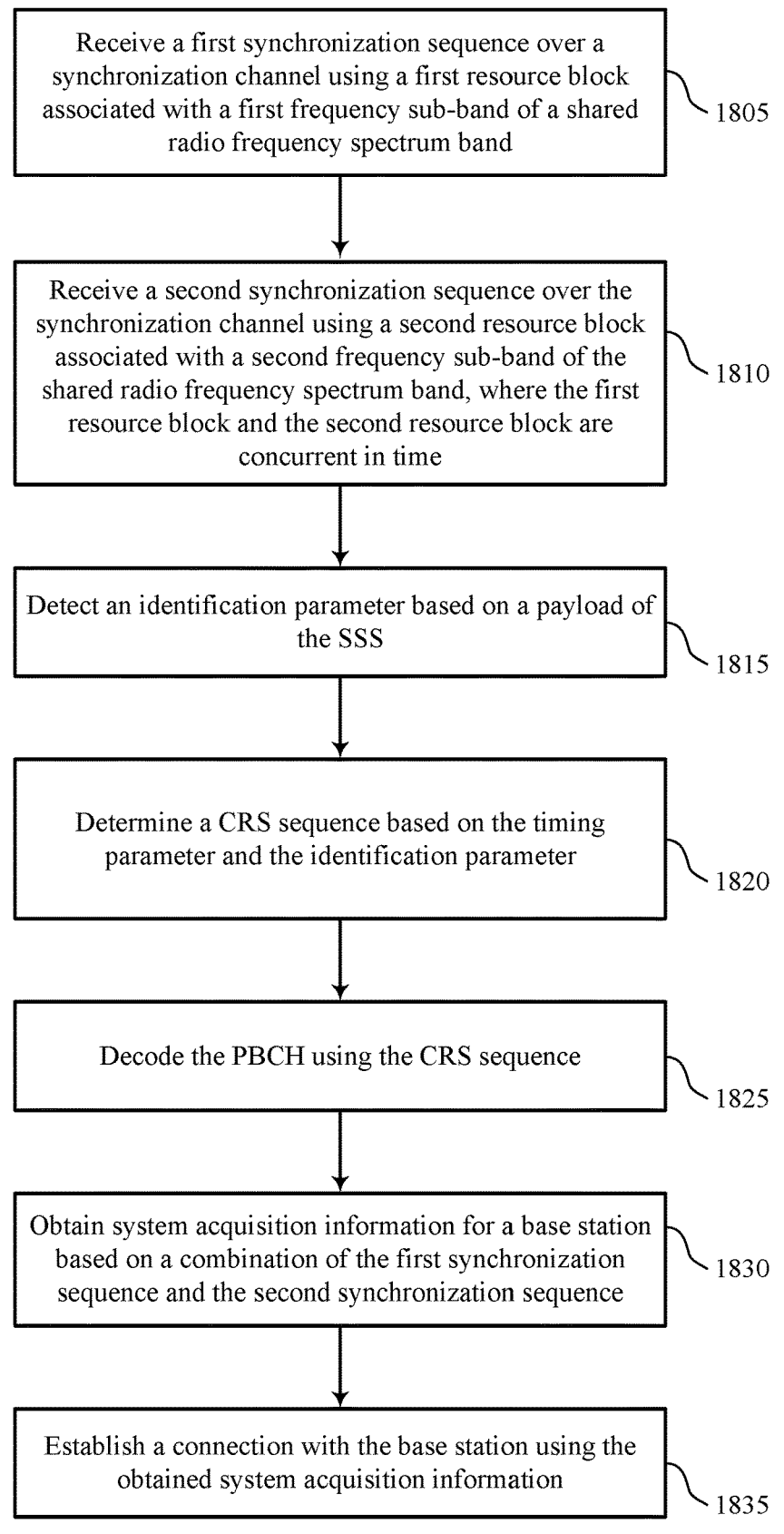

FIG. 18 shows a flowchart illustrating a method 1800 for synchronization channel and system acquisition for IoT communications in a shared spectrum in accordance with aspects of the present disclosure. The operations of method 1800 may be implemented by a UE 115 or its components as described herein. For example, the operations of method 1800 may be performed by a UE synchronization manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may receive a first synchronization sequence over a synchronization channel using a first resource block associated with a first frequency sub-band of a shared radio frequency spectrum band. In some cases, the first synchronization sequence comprises at least one of a PSS, an SSS, a PBCH, or combinations thereof. The operations of block 1805 may be performed according to the methods described herein. In certain examples, aspects of the operations of block 1805 may be performed by a synchronization sequence component as described with reference to FIGS. 11 through 14.

At block 1810 the UE 115 may receive a second synchronization sequence over the synchronization channel using a second resource block associated with a second frequency sub-band of the shared radio frequency spectrum band. In some cases, the first resource block and the second resource block are concurrent in time. The operations of block 1810 may be performed according to the methods described herein. In certain examples, aspects of the operations of block 1810 may be performed by a synchronization sequence component as described with reference to FIGS. 11 through 14.

At block 1815 the UE 115 may detect an identification parameter based on a payload of the SSS. The UE 115 may detect a timing parameter based on a content of the PSS. The operations of block 1815 may be performed according to the methods described herein. In certain examples, aspects of the operations of block 1815 may be performed by a parameter component as described with reference to FIGS. 11 through 14.

At block 1820 the UE 115 may determine a CRS sequence based on the timing parameter and the identification parameter. The operations of block 1820 may be performed according to the methods described herein. In certain examples, aspects of the operations of block 1820 may be performed by a parameter component as described with reference to FIGS. 11 through 14.

At block 1825 the UE 115 may decode the PBCH using the CRS sequence. The operations of block 1825 may be performed according to the methods described herein. In certain examples, aspects of the operations of block 1825 may be performed by a decoding component as described with reference to FIGS. 11 through 14.

At block 1830 the UE 115 may obtain system acquisition information for a base station based on a combination of the first synchronization sequence and the second synchronization sequence. The operations of block 1830 may be performed according to the methods described herein. In certain examples, aspects of the operations of block 1830 may be performed by a system acquisition component as described with reference to FIGS. 11 through 14.

At block 1835 the UE 115 may establish a connection with the base station using the obtained system acquisition information. The operations of block 1835 may be performed according to the methods described herein. In certain examples, aspects of the operations of block 1835 may be performed by a connection component as described with reference to FIGS. 11 through 14.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving a first synchronization sequence over a synchronization channel using a first resource block associated with a first frequency sub-band of a shared radio frequency spectrum band;
   receiving a second synchronization sequence over the synchronization channel using a second resource block associated with a second frequency sub-band of the shared radio frequency spectrum band, wherein the second synchronization sequence is phase-shifted from the first synchronization sequence by a first phase shift;
   receiving a third synchronization sequence over the synchronization channel using a third resource block associated with a third frequency sub-band of the shared radio frequency spectrum band, wherein the third synchronization sequence is phase-shifted from the first synchronization sequence by a second phase shift; and wherein the first resource block, the second resource block, and the third resource block are concurrent in time;
   obtaining system acquisition information for a base station based at least in part on the combination of the first synchronization sequence, the second synchronization sequence, and the third synchronization sequence; and
   establishing a connection with the base station using the obtained system acquisition information.

2. The method of claim 1, further comprising:
   applying the first phase shift to the second synchronization sequence to obtain a phase-shifted version of the second synchronization sequence.

3. The method of claim 1, further comprising:
   applying the second phase shift to the third synchronization sequence to obtain a phase-shifted version of the third synchronization sequence.

4. The method of claim 1, wherein the second phase shift is a multiple of the first phase shift.

5. The method of claim 1, wherein the first phase shift is different from the second phase shift, and the second phase shift is based at least in part on a payload of a secondary synchronization signal (SSS).

6. The method of claim 1, wherein the first phase shift is based at least in part on a bandwidth of the shared radio frequency spectrum band.

7. The method of claim 1, wherein the first synchronization sequence indicates a primary synchronization signal (PSS), a secondary synchronization signal (SSS), and a physical broadcast channel (PBCH).

8. The method of claim 7, wherein the second synchronization sequence is based at least in part on a content of the PSS, a content of the SSS, and a content of the PBCH.

9. The method of claim 8, wherein obtaining the system acquisition information for the base station comprises:
   detecting a timing parameter based at least in part on the content of the PSS;
   detecting an identification parameter based at least in part on a payload of the SSS;
   determining a cell specific reference signal (CRS) sequence based at least in part on the timing parameter and the identification parameter; and
   decoding the PBCH using the CRS sequence.

10. An apparatus for wireless communication, comprising:
    a processor;
    memory in electronic communication with the processor; and
    instructions stored in the memory, wherein the instructions are executable by the processor to:
       receive a first synchronization sequence over a synchronization channel using a first resource block associated with a first frequency sub-band of a shared radio frequency spectrum band;
       receive a second synchronization sequence over the synchronization channel using a second resource block associated with a second frequency sub-band of the shared radio frequency spectrum band, wherein the second synchronization sequence is phase-shifted from the first synchronization sequence by a first phase shift;
       receive a third synchronization sequence over the synchronization channel using a third resource block associated with a third frequency sub-band of the shared radio frequency spectrum band, wherein the third synchronization sequence is phase-shifted from the first synchronization sequence by a second phase shift; and wherein the first resource block, the second resource block, and the third resource block are concurrent in time;
       obtain system acquisition information for a base station based at least in part on the combination of the first synchronization sequence, the second synchronization sequence, and the third synchronization sequence; and
       establish a connection with the base station using the obtained system acquisition information.

11. The apparatus of claim 10, wherein the instructions are further executable by the processor to:
    apply the first phase shift to the second synchronization sequence to obtain a phase-shifted version of the second synchronization sequence.

12. The apparatus of claim 10, wherein the instructions are further executable by the processor to:
    apply the second phase shift to the third synchronization sequence to obtain a phase-shifted version of the third synchronization sequence.

13. The apparatus of claim 10, wherein the second phase shift is a multiple of the first phase shift.

14. The apparatus of claim 10, wherein the first phase shift is different from the second phase shift, and the second phase shift is based at least in part on a payload of a secondary synchronization signal (SSS).

15. The apparatus of claim 10, wherein the first phase shift is based at least in part on a bandwidth of the shared radio frequency spectrum band.

16. The apparatus of claim 10, wherein the first synchronization sequence indicates a primary synchronization signal (PSS), a secondary synchronization signal (SSS), and a physical broadcast channel (PBCH).

17. The apparatus of claim 16, wherein the second synchronization sequence is based at least in part on a content of the PSS, a content of the SSS, and a content of the PBCH.

18. The apparatus of claim 17, wherein the instructions executable by the processor to obtain the system acquisition information for the base station comprise instructions executable by the processor to:
  detect a timing parameter based at least in part on the content of the PSS;
  detect an identification parameter based at least in part on a payload of the SSS;
  determine a cell specific reference signal (CRS) sequence based at least in part on the timing parameter and the identification parameter; and
  decode the PBCH using the CRS sequence.

19. An apparatus for wireless communication, comprising:
  means for receiving a first synchronization sequence over a synchronization channel using a first resource block associated with a first frequency sub-band of a shared radio frequency spectrum band;
  means for receiving a second synchronization sequence over the synchronization channel using a second resource block associated with a second frequency sub-band of the shared radio frequency spectrum band, wherein the second synchronization sequence is phase-shifted from the first synchronization sequence by a first phase shift;
  means for receiving a third synchronization sequence over the synchronization channel using a third resource block associated with a third frequency sub-band of the shared radio frequency spectrum band, wherein the third synchronization sequence is phase-shifted from the first synchronization sequence by a second phase shift;
  and wherein the first resource block, the second resource block, and the third resource block are concurrent in time;
  means for obtaining system acquisition information for a base station based at least in part on a combination of the first synchronization sequence, the second synchronization sequence, and the third synchronization sequence; and
  means for establishing a connection with the base station using the obtained system acquisition information.

20. The apparatus of claim 19, further comprising:
  means for applying the first phase shift to the second synchronization sequence to obtain a phase-shifted version of the second synchronization sequence.

21. The apparatus of claim 19, further comprising:
  means for applying the second phase shift to the third synchronization sequence to obtain a phase-shifted version of the third synchronization sequence.

22. The apparatus of claim 19, wherein the second phase shift is a multiple of the first phase shift.

23. The apparatus of claim 19, wherein the first phase shift is different from the second phase shift, and the second phase shift is based at least in part on a payload of a secondary synchronization signal (SSS).

24. The apparatus of claim 19, wherein the first phase shift is based at least in part on a bandwidth of the shared radio frequency spectrum band.

25. The apparatus of claim 19, wherein the first synchronization sequence indicates a primary synchronization signal (PSS), a secondary synchronization signal (SSS), and a physical broadcast channel (PBCH).

26. The apparatus of claim 25, wherein the second synchronization sequence is based at least in part on a content of the PSS, a content of the SSS, and a content of the PBCH.

27. The apparatus of claim 26, wherein the means for obtaining the system acquisition information for the base station further comprises:
  means for detecting a timing parameter based at least in part on the content of the PSS;
  means for detecting an identification parameter based at least in part on a payload of the SSS;
  means for determining a cell specific reference signal (CRS) sequence based at least in part on the timing parameter and the identification parameter; and
  means for decoding the PBCH using the CRS sequence.

28. A non-transitory computer-readable medium storing code for wireless communication at a user equipment (UE), the code comprising instructions executable by a processor to:
  receive a first synchronization sequence over a synchronization channel using a first resource block associated with a first frequency sub-band of a shared radio frequency spectrum band;
  receive a second synchronization sequence over the synchronization channel using a second resource block associated with a second frequency sub-band of the shared radio frequency spectrum band, wherein the second synchronization sequence is phase-shifted from the first synchronization sequence by a first phase shift;
  receiving a third synchronization sequence over the synchronization channel using a third resource block associated with a third frequency sub-band of the shared radio frequency spectrum band, wherein the third synchronization sequence is phase-shifted from the first synchronization sequence by a second phase shift; and wherein the first resource block, the second resource block, and the third resource block are concurrent in time;
  obtain system acquisition information for a base station based at least in part on a combination of the first synchronization sequence, the second synchronization sequence, and the third synchronization sequence; and
  establish a connection with the base station using the obtained system acquisition information.

29. The non-transitory computer-readable medium of claim 28, wherein the instructions executable are further executable by the processor to:
  apply the first phase shift to the second synchronization sequence to obtain a phase-shifted version of the second synchronization sequence.

30. The non-transitory computer-readable medium of claim 29, wherein the instructions are further executable by the processor to:
  apply the second phase shift to the third synchronization sequence to obtain a phase-shifted version of the third synchronization sequence.

* * * * *